US010248565B2

(12) United States Patent
Turner et al.

(10) Patent No.: US 10,248,565 B2
(45) Date of Patent: Apr. 2, 2019

(54) HYBRID INPUT/OUTPUT COHERENT WRITE

(71) Applicant: QUALCOMM Incorporated, San Diego, CA (US)

(72) Inventors: Andrew Edmund Turner, San Diego, CA (US); Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 15/268,791

(22) Filed: Sep. 19, 2016

(65) Prior Publication Data
US 2018/0081809 A1 Mar. 22, 2018

(51) Int. Cl.
```
G06F 9/45        (2006.01)
G06F 12/08       (2016.01)
G06F 12/0808     (2016.01)
G06F 12/0815     (2016.01)
G06F 12/0817     (2016.01)
G06F 3/06        (2006.01)
G06F 13/16       (2006.01)
G06F 13/40       (2006.01)
G06F 12/0831     (2016.01)
```
(52) U.S. Cl.
CPC ......... *G06F 12/0828* (2013.01); *G06F 3/065* (2013.01); *G06F 3/0613* (2013.01); *G06F 3/0659* (2013.01); *G06F 3/0685* (2013.01); *G06F 12/0835* (2013.01); *G06F 13/1663* (2013.01); *G06F 13/4022* (2013.01); *G06F 2212/621* (2013.01); *Y02D 10/13* (2018.01); *Y02D 10/14* (2018.01); *Y02D 10/151* (2018.01)

(58) Field of Classification Search
CPC ............. G06F 12/0811; G06F 12/0864; G06F 12/0831; G06F 12/0897; G06F 12/0862; G06F 12/0886; G06F 12/084; G06F 12/0855; G06F 12/1045
USPC .......................................................... 711/147
See application file for complete search history.

(56) References Cited

U.S. PATENT DOCUMENTS

| 6,711,632 B1 | 3/2004 | Chow et al. |
| 7,827,362 B2 | 11/2010 | Passerini |
| 9,264,380 B2 | 2/2016 | Hass |

(Continued)

FOREIGN PATENT DOCUMENTS

WO    9923565 A1    5/1999

OTHER PUBLICATIONS

International Search Report and Written Opinion—PCT/US2017/047982—ISA/EPO—dated Nov. 27, 2017.

*Primary Examiner* — Mohamed M Gebril
(74) *Attorney, Agent, or Firm* — The Marbury Law Group/Qualcomm

(57) ABSTRACT

Aspects include computing devices, apparatus, and methods implemented by the apparatus for implementing a hybrid input/output (I/O) coherent write request on a computing device, including receiving an I/O coherent write request, generating a first hybrid I/O coherent write request and a second hybrid I/O coherent write request from the I/O coherent write request, sending the first hybrid I/O coherent write request and I/O coherent write data of the I/O coherent write request to a shared memory, and sending the second hybrid I/O coherent write request without the I/O coherent write data of the I/O coherent write request to a coherency domain.

30 Claims, 15 Drawing Sheets

(56) References Cited

U.S. PATENT DOCUMENTS

| | | | | |
|---|---|---|---|---|
| 9,317,102 | B2* | 4/2016 | Kanchana | G06F 1/3225 |
| 9,823,730 | B2* | 11/2017 | Kanchana | G06F 1/3275 |
| 2004/0117561 | A1* | 6/2004 | Quach | G06F 12/082 |
| | | | | 711/146 |
| 2004/0148472 | A1 | 7/2004 | Barroso et al. | |
| 2004/0193809 | A1 | 9/2004 | Dieffenderfer et al. | |
| 2005/0160231 | A1* | 7/2005 | Doren | G06F 12/0828 |
| | | | | 711/141 |
| 2008/0120441 | A1 | 5/2008 | Loewenstein | |
| 2009/0271583 | A1* | 10/2009 | Kershaw | G06F 12/1491 |
| | | | | 711/163 |
| 2010/0113120 | A1* | 5/2010 | Snow | G07F 17/32 |
| | | | | 463/16 |
| 2010/0161923 | A1* | 6/2010 | GadelRab | G06F 12/02 |
| | | | | 711/162 |
| 2014/0040552 | A1* | 2/2014 | Rychlik | G06F 12/0815 |
| | | | | 711/122 |
| 2014/0189411 | A1* | 7/2014 | Kanchana | G06F 1/3225 |
| | | | | 713/324 |
| 2015/0378899 | A1* | 12/2015 | Busaba | G06F 12/0808 |
| | | | | 711/130 |
| 2016/0283382 | A1 | 9/2016 | Fahim et al. | |
| 2017/0091092 | A1* | 3/2017 | Hur | G06F 12/0833 |
| 2018/0095823 | A1* | 4/2018 | Fahim | G06F 12/0811 |

* cited by examiner

HYBRID INPUT/OUTPUT COHERENT WRITE

BACKGROUND

Accelerators can be used to help a central processing unit (CPU) process workloads. The workloads often require using data from a CPU cache. The accelerators can write data from the workload executions to random access memory (RAM). In input/output (I/O) coherent mode, transmitting a request to write the data to the RAM and transmitting the data to write to the RAM is routed through an interconnect to the RAM and to the RAM through a coherent domain. The path to request writing data to the RAM and the path for data to be written to the RAM are duplicated to pass from the interconnect to the RAM, from the interconnect to the coherent domains, and then to the RAM. The duplicate the paths from the interconnect to the RAM increase area costs in a device having I/O coherent capabilities. The duplicate paths through the coherent domain can also be less efficient than the path from the interconnect to the RAM. The lower efficient path can incur speed, latency, and/or power penalties.

SUMMARY

Various disclosed aspects may include apparatuses and methods for implementing a hybrid input/output (I/O) coherent write request on a computing device. Various aspects may include receiving an I/O coherent write request, generating a first hybrid I/O coherent write request and a second hybrid I/O coherent write request from the I/O coherent write request, sending the first hybrid I/O coherent write request and I/O coherent write data of the I/O coherent write request to a shared memory, and sending the second hybrid I/O coherent write request without the I/O coherent write data of the I/O coherent write request to a coherency domain.

Some aspects may further include determining whether a hybrid I/O coherent write mode is enabled, in which generating a first hybrid I/O coherent write request and a second hybrid I/O coherent write request from the I/O coherent write request may include generating the first hybrid I/O coherent write request and the second hybrid I/O coherent write request from the I/O coherent write request in response to determining that the hybrid I/O coherent write mode is enabled.

Some aspects may further include marking the I/O coherent write request as a hybrid I/O coherent write request in response to determining that the hybrid I/O coherent write mode is enabled.

Some aspects may further include receiving an acknowledgement of the first hybrid I/O coherent write request from the shared memory, and sending the acknowledgement of the first hybrid I/O coherent write request to a processing device that issued the I/O coherent write request.

Some aspects may further include receiving the second hybrid I/O coherent write request at the coherency domain, executing a coherency check for an address of I/O coherency write data specified by the second hybrid I/O coherent write request, and receiving an acknowledgement of the first hybrid I/O coherent write request from the shared memory.

Some aspects may further include receiving, from a coherent interconnect, the first hybrid I/O coherent write request and the I/O coherent write data at the shared memory, executing the first hybrid I/O coherent write request, and sending an acknowledgement of the first hybrid I/O coherent write request to the coherent interconnect.

Some aspects may further include receiving the acknowledgement of the first hybrid I/O coherent write request by the coherency domain from the coherent interconnect, and receiving the acknowledgement of the first hybrid I/O coherent write request by a processing device that issued the I/O coherent write request from the coherent interconnect.

Some aspects may further include offloading, by a processing device, a workload to a hardware accelerator for execution using an I/O coherent mode, detecting, by the processing device, a dynamic trigger for switching a coherent interconnect from a non-hybrid I/O coherent write mode to a hybrid I/O coherent write mode while the workload is executed by the hardware accelerator, and switching the coherent interconnect from a non-hybrid I/O coherent write mode to the hybrid I/O coherent write mode in response to detecting the dynamic trigger.

Further aspects include a computing device having a shared memory, a processing device, a coherency domain, and a coherent interconnect configured to perform operations of the methods summarized above. Further aspects include a computing device having means for performing functions of the methods summarized above. Further aspects include a non-transitory processor-readable storage medium having stored thereon processor-executable instructions configure to cause a processing device of a computing device to perform operations of the methods summarized above.

BRIEF DESCRIPTION OF THE DRAWINGS

The accompanying drawings, which are incorporated herein and constitute part of this specification, illustrate example aspects of various aspects, and together with the general description given above and the detailed description given below, serve to explain the features of the claims.

DETAILED DESCRIPTION

Figure 1:
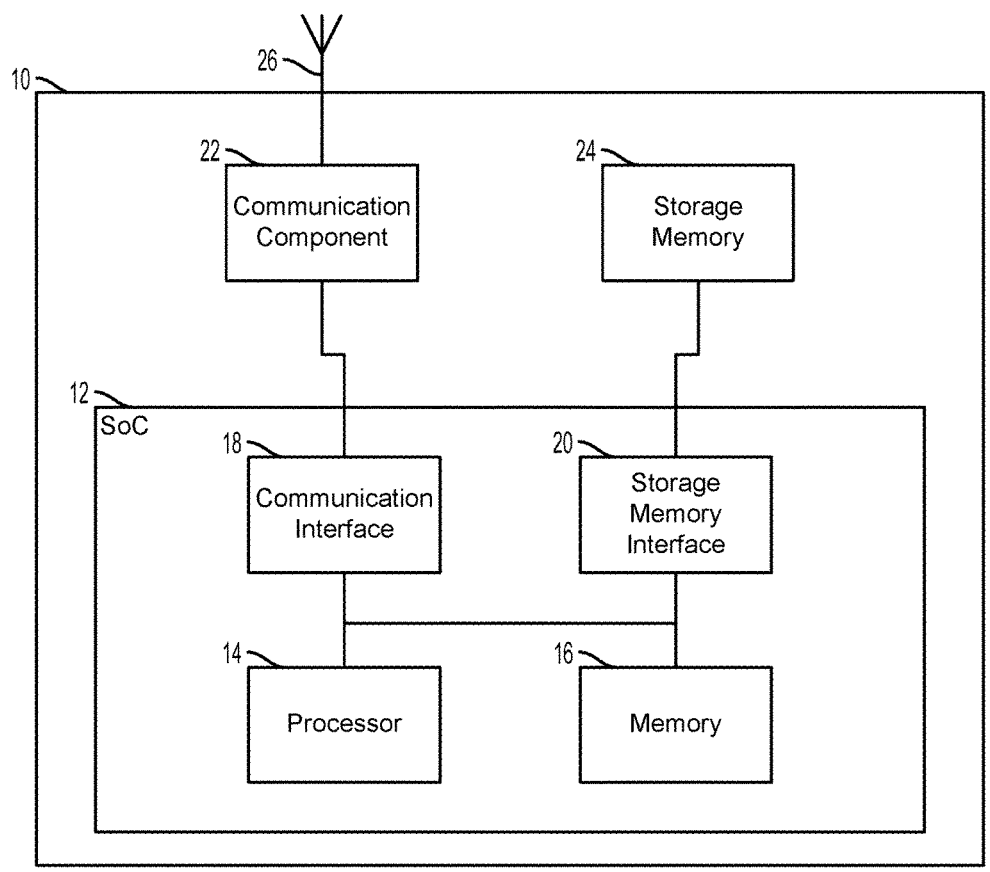
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various aspects may include methods, and systems and devices implementing such methods for implementing input/output (I/O) coherent write operations for offloaded workloads by hardware accelerators to random access memory (RAM) with non-I/O coherent performance and I/O coherent benefits. The multiple processors may be multicore processors. The apparatus and methods of the various aspects may include foregoing the write data path to the coherency domain from the interconnect and splitting the write request at the interconnect for the write request path from the interconnect to the coherency domain and the RAM.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Write operations for non-I/O coherent systems may require less hardware than I/O coherent systems since there is no need to implement a coherency domain. The write requests for non-I/O coherent systems may be executed quicker because of the fewer steps involved in transmitting the write data between the fewer hardware components. Also, data paths to the coherency domain between a hardware accelerator and the RAM may be less efficient in I/O coherent systems than the data path between the accelerator and the RAM in non-I/O coherent systems. However, non-I/O coherent system write operations may incur greater memory maintenance operation overhead penalties than I/O coherent systems write operations. This is because I/O coherent systems may continually manage memory coherency rather than having to execute memory maintenance operations before and after the write operations as in non-I/O coherent systems.

Hybrid I/O coherent write may duplicate only the write request path from the interconnect to the RAM to also transmit from the interconnect to the coherency domain. Hybrid I/O coherent write may forego the data path to the coherency domain from the interconnect, transmitting the data along the data path from the accelerator through the interconnect to the RAM. Eliminating the duplicate data path to the coherency domain may save area, power, and bandwidth, and reduce latency, while keeping the duplicate request path to the coherency domain may allow for memory coherency operations to be implemented.

To implement hybrid I/O coherent write, when hybrid I/O coherent write is enabled, the interconnect may receive a write request with associated write data from an accelerator and mark the write request as a hybrid I/O coherent write request by adding or using an existing field in the write request. The interconnect may duplicate the hybrid I/O coherent write request and send a first duplicate of the hybrid I/O coherent write request to the RAM and send a second duplicate of the hybrid I/O coherent write request to the coherency domain. The interconnect may also send the write data to the RAM without duplicating the write data and sending it to the coherency domain. The RAM may send duplicate acknowledgements for the hybrid I/O coherent write request along two paths. A first duplicate acknowledgement may be sent via a first acknowledgement path back through the interconnect to the accelerator and a second duplicate acknowledgement may be sent via a second acknowledgement path to the coherency domain.

The coherency domain may manage coherency of the memory based on the second duplicate of the hybrid I/O coherent write request and the second duplicate acknowledgement. The coherency domain may implement coherency checks and invalidates based on the second duplicate of the hybrid I/O coherent write request. The coherency domain may implement clear transactions based on the second duplicate acknowledgement. The memory driver may forego using memory invalidate maintenance operations because the coherency domain may manage the coherency of the memory.

The write request path from the interconnect to the coherency domain may need to support only the bandwidth necessary for the write request, and may not need to support the bandwidth for the write request data. In various aspects, the bandwidth for the write request may be half or less than half of the full bandwidth of a path between the interconnect and the coherency domain.

FIG. 1 illustrates a system including a computing device 10 suitable for use with the various aspects. The computing device 10 may include a system-on-chip (SoC) 12 with a processor 14, a memory 16, a communication interface 18, and a storage memory interface 20. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an aspect of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be arranged differently and/or combined while still serving the functions of the various aspects. The computing device 10 may not be limited to one of each of the components, and multiple instances of each component may be included in various configurations of the computing device 10.

Figure 2:
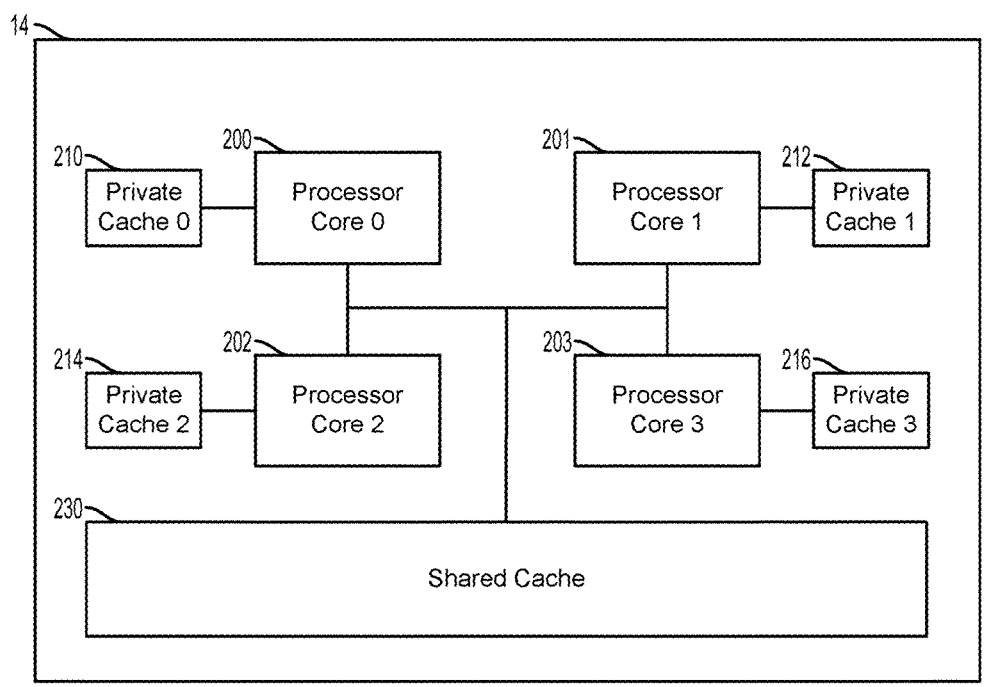
FIG. 2 is a component block diagram illustrating an example multicore processor suitable for implementing an aspect.

FIG. 2 illustrates a multicore processor suitable for implementing an aspect. The multicore processor 14 may include multiple processor types, including, for example, a central processing unit, a graphics processing unit, and/or a digital processing unit. The multicore processor 14 may also include a custom hardware accelerator which may include custom processing hardware and/or general purpose hardware configured to implement a specialized set of functions.

The multicore processor may have a plurality of homogeneous or heterogeneous processor cores 200, 201, 202, 203. A homogeneous multicore processor may include a plurality of homogeneous processor cores. The processor cores 200, 201, 202, 203 may be homogeneous in that, the processor cores 200, 201, 202, 203 of the multicore processor 14 may be configured for the same purpose and have the same or similar performance characteristics. For example, the multicore processor 14 may be a general purpose processor, and the processor cores 200, 201, 202, 203 may be homogeneous general purpose processor cores. The multicore processor 14 may be a graphics processing unit or a digital signal processor, and the processor cores 200, 201, 202, 203 may be homogeneous graphics processor cores or digital signal processor cores, respectively. The multicore processor 14 may be a custom hardware accelerator with homogeneous processor cores 200, 201, 202, 203. For ease of reference, the terms "custom hardware accelerator," "processor," and "processor core" may be used interchangeably herein.

A heterogeneous multicore processor may include a plurality of heterogeneous processor cores. The processor cores 200, 201, 202, 203 may be heterogeneous in that the processor cores 200, 201, 202, 203 of the multicore processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar aspects, an SoC (for example, SoC 12 of FIG. 1) may include any number of homogeneous or heterogeneous multicore processors 14. In various aspects, not all off the processor cores 200, 201, 202, 203 need to be heterogeneous processor cores, as a heterogeneous multicore processor may include any combination of processor cores 200, 201, 202, 203 including at least one heterogeneous processor core.

Each of the processor cores 200, 201, 202, 203 of a multicore processor 14 may be designated a private cache 210, 212, 214, 216 that may be dedicated for read and/or write access by a designated processor core 200, 201, 202, 203. The private cache 210, 212, 214, 216 may store data and/or instructions, and make the stored data and/or instructions available to the processor cores 200, 201, 202, 203, to which the private cache 210, 212, 214, 216 is dedicated, for use in execution by the processor cores 200, 201, 202, 203. The private cache 210, 212, 214, 216 may include volatile memory as described herein with reference to memory 16 of FIG. 1.

The multicore processor 14 may further include a shared cache 230 that may be configured to for read and/or write access by the processor cores 200, 201, 202, 203. The private cache 210, 212, 214, 216 may store data and/or instructions, and make the stored data and/or instructions available to the processor cores 200, 201, 202, 203, for use in execution by the processor cores 200, 201, 202, 203. The shared cache 230 may also function as a buffer for data and/or instructions input to and/or output from the multicore processor 14. The shared cache 230 may include volatile memory as described herein with reference to memory 16 of FIG. 1.

In the example illustrated in FIG. 2, the multicore processor 14 includes four processor cores 200, 201, 202, 203 (i.e., processor core 0, processor core 1, processor core 2, and processor core 3). In the example, each processor core 200, 201, 202, 203 is designated a respective private cache 210, 212, 214, 216 (i.e., processor core 0 and private cache 0, processor core 1 and private cache 1, processor core 2 and private cache 2, and processor core 3 and private cache 3). For ease of explanation, the examples herein may refer to the four processor cores 200, 201, 202, 203 and the four private caches 210, 212, 214, 216 illustrated in FIG. 2. However, the four processor cores 200, 201, 202, 203 and the four private caches 210, 212, 214, 216 illustrated in FIG. 2 and described herein are merely provided as an example and in no way are meant to limit the various aspects to a four-core processor system with four designated private caches. The computing device 10, the SoC 12, or the multicore processor 14 may individually or in combination include fewer or more than the four processor cores 200, 201, 202, 203 and private caches 210, 212, 214, 216 illustrated and described herein.

Figure 3A:
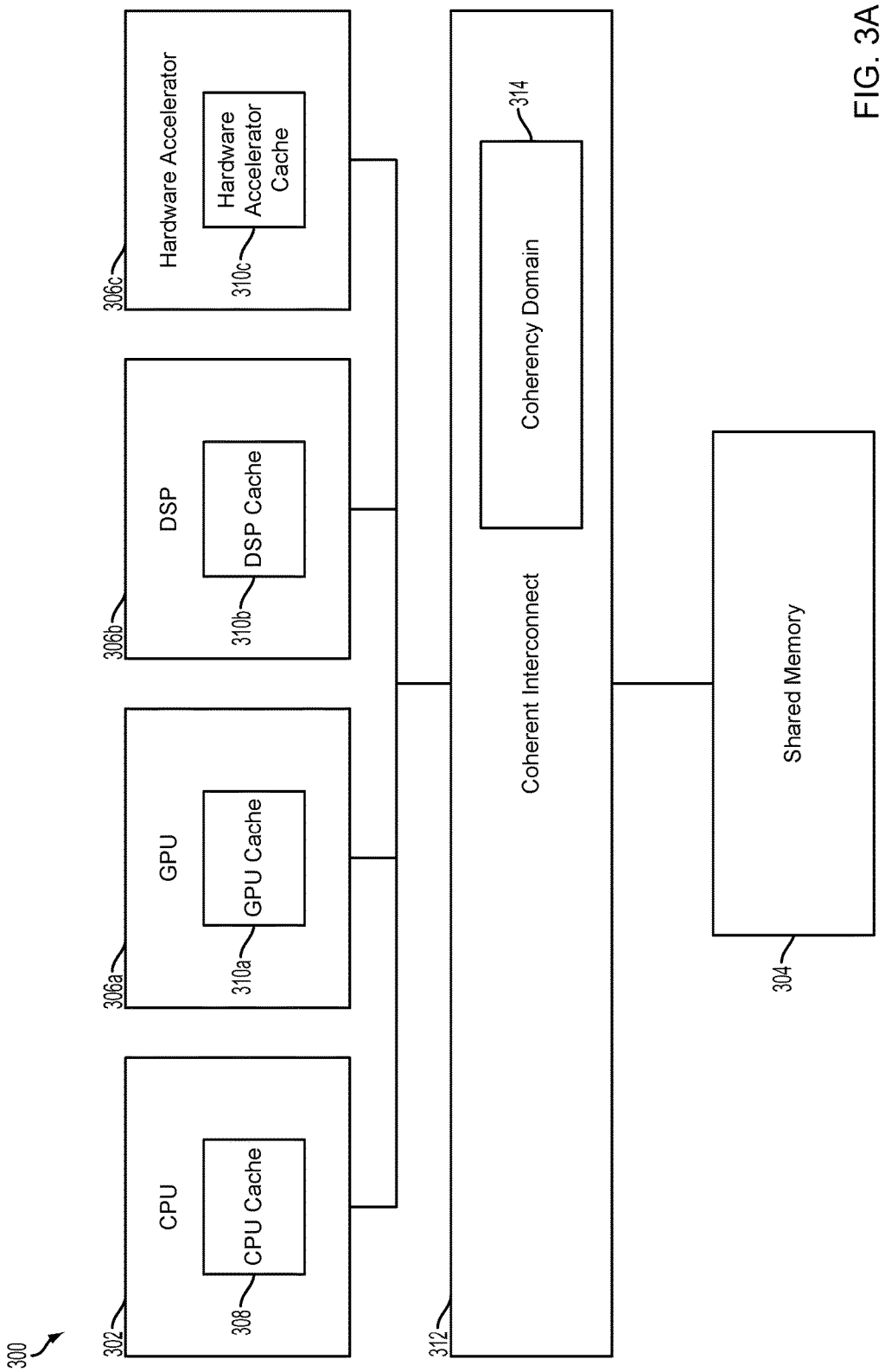
FIG. 3A is a block diagram illustrating an example heterogeneous computing device having a coherent interconnect suitable for implementing an aspect.
Figure 3B:
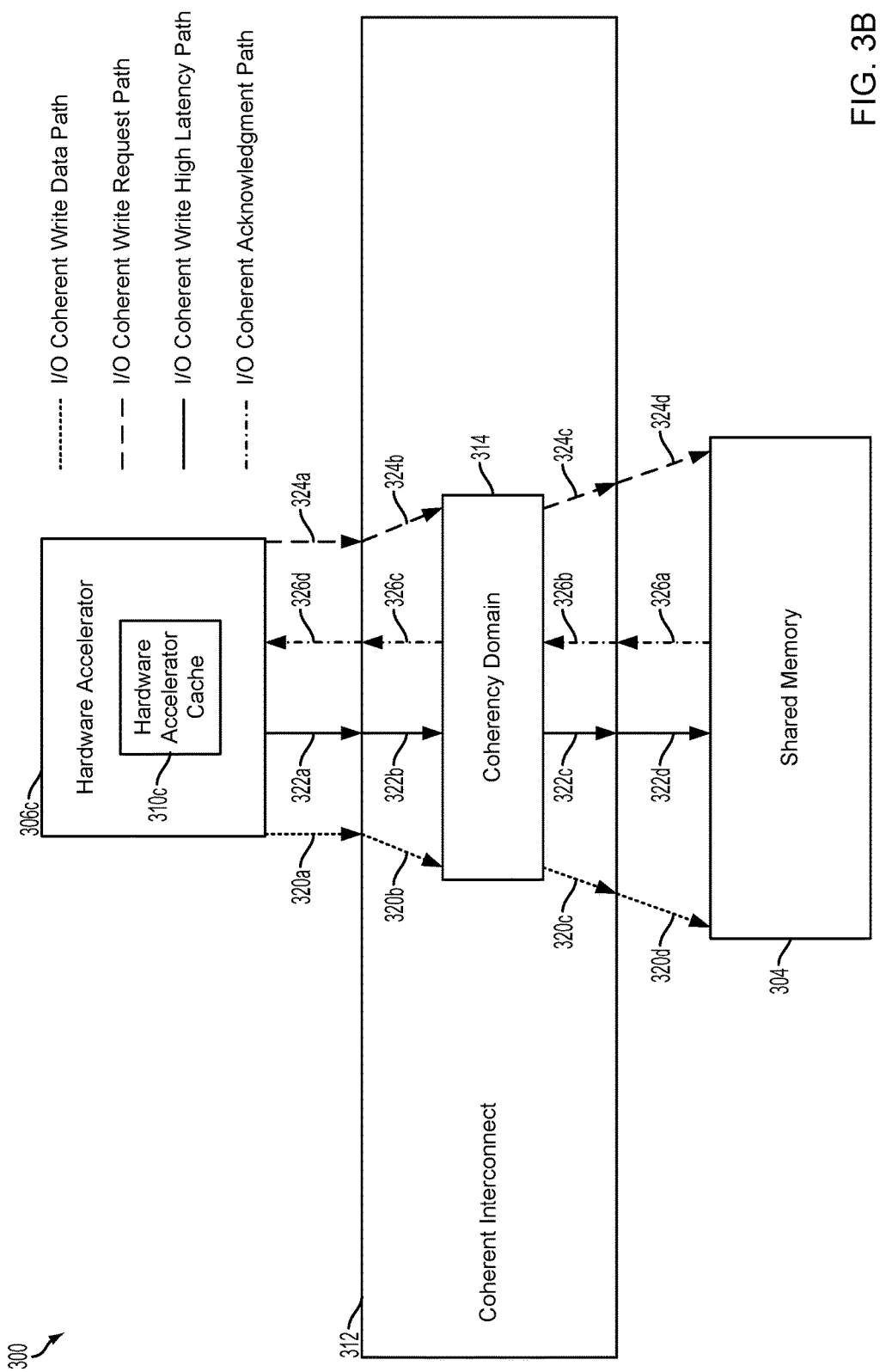
FIG. 3B is a block and signaling diagram illustrating an example heterogeneous computing device implementing I/O coherent write according to an aspect.
Figure 3C:
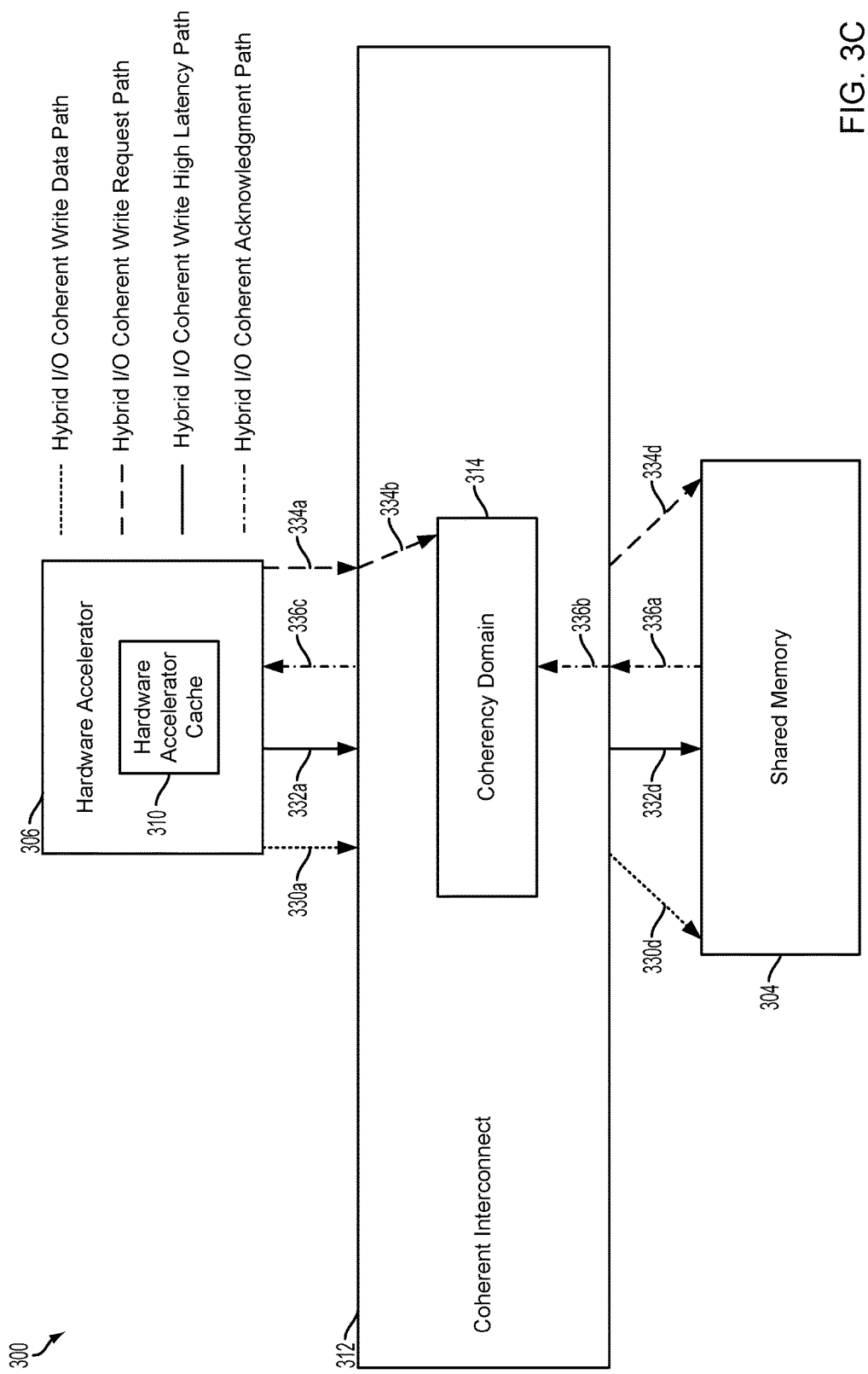
FIG. 3C is a block and signaling diagram illustrating an example heterogeneous computing device implementing hybrid I/O coherent write according to an aspect.

FIGS. 3A-3C illustrate example aspects of a heterogeneous computing device having a coherent interconnect. A heterogeneous computing device (e.g., the computing device 10 in FIG. 1) configured to implement a hybrid I/O coherent write and/or a dynamic I/O coherency system 300 may include at least two, but up to any integer number "N" processing devices (e.g., processor 14 in FIGS. 1 and 2); for example, processing device (e.g., CPU) 302, hardware accelerator (e.g., GPU) 306a, hardware accelerator (e.g., DSP) 306b, and/or custom hardware accelerator 306c. Each processing device 302, 306a, 306b, 306c may be associated with a processing device cache (e.g., private caches 210, 212, 214, 216, and/or shared cache 230 in FIG. 2). For example, the processing device 302 may include a processing device cache (e.g., CPU cache) 308, the hardware accelerator 306a may include a hardware accelerator cache (e.g., GPU cache) 310a, the hardware accelerator 306b may include a hardware accelerator cache (e.g., DSP cache) 310b, and/or the custom hardware accelerator 306c may include a custom hardware accelerator cache 310c. As discussed herein, each of the processing devices 302, 306a, 306b, 306c may be homogenous and/or heterogeneous with respect to each other and/or among their respective processor cores (e.g., processor cores 200, 201, 202, 203 in FIG. 2).

A coherent interconnect 312 may be communicatively connected to the processing devices 302, 306a, 306b, 306c, and any number of main memory or random access memory components, such as shared memory 304 (e.g., memory 16, 24 in FIG. 1). The coherent interconnect 312 may be configured to enable and control transmission of data between the various connected components. For a processing device cache 308, 310a, 310b, 310c and/or the shared memory 304 operating in an I/O coherent mode, the coherency mechanisms may be continuously implemented by the coherent interconnect 312 to ensure the correctness of the data in the processing device cache 308, 310a, 310b, 310c and/or the shared memory 304. The coherent interconnect 312 may be configured to transmit data between the processing devices 302, 306a, 306b, 306c so that the processing devices 302, 306a, 306b, 306c may share processing of a workload and output the results of the workload processing. For the results to be correct, the data input to and output from the processing devices 302, 306a, 306b, 306c may be subject to coherency requirements that may be implemented by the coherency mechanisms of the coherent interconnect 312 while the I/O coherent mode is active. In various aspects, a coherency domain 314 or other coherency mechanisms of the coherent interconnect 312, such as a snoop filter (not shown), may be configured to perform coherency checks and invalidations based on receipt of memory access requests to the processing device cache 308, 310a, 310b, 310c and/or the shared memory 304. The coherency domain 314 may also be configured to clear transactions based on receipt of acknowledgements of the transactions between the processing devices 302, 306a, 306b, 306c and/or the shared memory 304.

While the I/O coherent mode is inactive, or the processing device cache 308, 310a, 310b, 310c and/or the shared memory 304 is in a non-I/O coherent mode, correctness of the data input to and output from the processing devices 302, 306a, 306b, 306c may be managed by the processing devices 302, 306a, 306b, 306c themselves. In various aspects, cache maintenance operations may be implemented by the processing devices 302, 306a, 306b, 306c for the data stored in the processing device cache 308, 310a, 310b, 310c. In various aspects, components of the processing devices 302, 306a, 306b, 306c, including cache management devices (not shown) and/or the processor cores, may be configured to implement the cache maintenance operations. The coherent interconnect 312 may still transmit data between the data between the processing devices 302, 306a, 306b and/or the shared memory 304 without conducting coherency operations.

FIG. 3B illustrates an example aspect of a heterogeneous computing device having a coherent interconnect implementing an I/O coherent write request. The example in FIG.

3B illustrates the custom hardware accelerator 306c, which may be replaced by any of the hardware accelerators 306a, 306b, issuing an I/O coherent write request with I/O coherent write request data. The custom hardware accelerator 306c may issue the I/O coherent write request to the shared memory 304. The I/O coherent write request may follow an I/O coherent write request path 324a, 324b, 324c, 324d and the I/O coherent write request data may follow an I/O coherent write data path 320a, 320b, 320c, 320d. Upon issuing the I/O coherent write request, the custom hardware accelerator 306c may send the I/O coherent write request to the coherent interconnect 312 along the I/O coherent write request path 324a, and send the I/O coherent write request data to the coherent interconnect 312 along the I/O coherent write data path 320a.

The coherent interconnect 312 may direct the I/O coherent write request to the coherency domain 314 along the I/O coherent write request path 324b, and direct the I/O coherent write request data to the coherency domain 314 along the I/O coherent write data path 320b. As described herein, the coherency domain 314 may execute various coherency operations to ensure the correctness of the I/O coherent write request data. The coherency domain 314 may send the I/O coherent write request back to the coherent interconnect 312 along the I/O coherent write request path 324c, and send the I/O coherent write request data back to the coherent interconnect 312 along the I/O coherent write data path 320c. The coherent interconnect 312 may send the I/O coherent write request to the shared memory 304 along the I/O coherent write request path 324d, and send the I/O coherent write request data to the shared memory 304 along the I/O coherent write data path 320d.

In response to the I/O coherent write request, the shared memory 304 may return an acknowledgement to the custom hardware accelerator 306c and the coherency domain 314 along the I/O coherent acknowledgment path 326a, 326b, 326c, 326d. The I/O coherent acknowledgment path 326a, 326b, 326c, 326d may follow the I/O coherent write request path 324a, 324b, 324c, 324d backwards from the shared memory 304 to the custom hardware accelerator 306c, and may be referred to as the I/O coherent acknowledgment path 326a, 326b, 326c, 326d. The shared memory 304 may send the acknowledgement to the coherent interconnect 312 along the I/O coherent acknowledgment path 326a. The coherent interconnect 312 may send the acknowledgement to the coherency domain 314 along the I/O coherent acknowledgment path 326b. The coherent interconnect 312 may send the acknowledgement back to the coherent interconnect 312 along the I/O coherent acknowledgment path 326c. The coherent interconnect 312 may send the acknowledgement to the custom hardware accelerator 306c along the I/O coherent acknowledgment path 326d.

This example illustrated in FIG. 3B shows a divergence in the I/O coherent write request path 324a, 324b, 324c, 324d and the I/O coherent write data path 320a, 320b, 320c through the coherent interconnect 312 as compared to a non-I/O coherent write request with non-I/O coherent write data. As illustrated, the I/O coherent write request and the I/O coherent write request data may be sent through the coherency domain 314. A non-I/O coherent write request and non-I/O coherent write data may be sent directly to the shared memory 304 by the coherent interconnect 312 without being sent to the coherency domain 314. Each of the paths from the custom hardware accelerator 306c to the shared memory 304 may have their own latency. The example illustrated in FIG. 3B shows an I/O coherent write high latency path 322a, 322b, 322c, 322d. The latency for transmitting the I/O coherent write request and/or the I/O coherent write request data may follow along the I/O coherent write high latency path 322a from the custom hardware accelerator 306c to the coherent interconnect 312; along the I/O coherent write high latency path 322b from the coherent interconnect 312 to the coherency domain 314; along the I/O coherent write high latency path 322c from the coherency domain 314 back to the coherent interconnect 312; and along the I/O coherent write high latency path 322d from the coherent interconnect 312 to the shared memory 304.

FIG. 3C illustrates an example aspect of a heterogeneous computing device having a coherent interconnect implementing a hybrid I/O coherent write request. The example in FIG. 3C illustrates the custom hardware accelerator 306c, which may be replaced by any of the hardware accelerators 306a, 306b, issuing a I/O coherent write request with I/O coherent write request data with a hybrid I/O coherent write mode enabled. The custom hardware accelerator 306c may issue the I/O coherent write request to the shared memory 304. The I/O coherent write request may follow a hybrid I/O coherent write request path 334a, 334b, 334d and the I/O coherent write request data may follow a hybrid I/O coherent write data path 330a, 330d. Upon issuing the I/O coherent write request, the custom hardware accelerator 306c may send the I/O coherent write request to the coherent interconnect 312 along the hybrid I/O coherent write request path 334a, and send the I/O coherent write request data to the coherent interconnect 312 along the hybrid I/O coherent write data path 330a.

The coherent interconnect 312 may determine that the hybrid I/O coherent write mode is enabled, mark the I/O coherent write request as a hybrid I/O coherent write request, and direct the hybrid I/O coherent write request to the coherency domain 314 along the hybrid I/O coherent write request path 334b. The coherent interconnect 312 may not direct the I/O coherent write request data to the coherency domain 314. As described herein, the coherency domain 314 may execute various coherency operations to ensure the correctness of the I/O coherent write request data. Since the coherency domain 314 may not receive the I/O coherent write request data, the coherency domain 314 may not send the hybrid I/O coherent write request and/or the I/O coherent write request data to the shared memory 304. The coherent interconnect 312 may send the hybrid I/O coherent write request to the shared memory 304 along the hybrid I/O coherent write request path 334d, and send the I/O coherent write request data to the shared memory 304 along the I/O coherent write data path 330d.

In response to the hybrid I/O coherent write request, the shared memory 304 may return an acknowledgement to the custom hardware accelerator 306c and the coherency domain 314 along the hybrid I/O coherent acknowledgment path 336a, 336b, 336c. The shared memory 304 may send the acknowledgement to the coherent interconnect 312 along the hybrid I/O coherent acknowledgment path 336a. In various aspects, the coherent interconnect 312 may send the acknowledgement to the coherency domain 314 along the hybrid I/O coherent acknowledgment path 336b. In various aspects, the shared memory 304 may send the acknowledgement to the coherency domain 314 along the hybrid I/O coherent acknowledgment path 336a, 336b. The coherent interconnect 312 may send the acknowledgement to the custom hardware accelerator 306c along the hybrid I/O coherent acknowledgment path 336c.

This example illustrated in FIG. 3C shows a divergence in the hybrid I/O coherent write request path 334a, 334b, 334d and the hybrid I/O coherent write data path 330a, 330d through the coherent interconnect 312. As illustrated, the hybrid I/O coherent write request may be sent to the coherency domain 314 and directly to the shared memory 304 by the coherent interconnect 312. However, unlike the example in FIG. 3B, the I/O coherent write request data may be sent directly to the shared memory 304 by the coherent interconnect 312, and not to the coherency domain 314. Each of the paths from the custom hardware accelerator 306c to the shared memory 304 may have their own latency. The example illustrated in FIG. 3B shows the I/O coherent write high latency path 322a, 322b, 322c, 322d passes through the coherent interconnect 312 and the coherency domain 314. The example illustrated in FIG. 3C shows a hybrid I/O coherent write high latency path 332a, 332d. The latency for transmitting the hybrid I/O coherent write request and/or the I/O coherent write request data may follow along the hybrid I/O coherent write high latency path 332a from the custom hardware accelerator 306c to the coherent interconnect 312, and along the hybrid I/O coherent write high latency path 332d from the coherent interconnect 312 to the shared memory 304.

The I/O coherent write high latency path 322a, 322b, 322c, 322d in the example illustrated in FIG. 3B may pass through the coherency domain 314, as the I/O coherent write request path 324a, 324b, 324c, 324d and the I/O coherent write data path 320a, 320b, 320c may both pass through the coherency domain 314. However, in the example illustrated in FIG. 3C, the hybrid I/O coherent write high latency path 332a, 332d may pass through the coherent interconnect 312 without passing through the coherency domain 314, as the hybrid I/O coherent write data path 330a, 330d may not pass through the coherency domain 314. The difference in latency may be explained by the shorter path in terms of the latency for distance, number of clock domain crossings, and associated logic of the hybrid I/O coherent write compared to the I/O coherent write. Hybrid IO-coherent write may provide a performance speed advantage compared to I/O coherent write by overlapping the coherency operations with the write request's traversal to and execution at the shared memory 304. Therefore, the hybrid I/O coherent write high latency path 332a, 332d may exhibit lower latency than the I/O coherent write high latency path 322a, 322b, 322c, 322d. Similarly, slower performance for I/O coherent write requests versus hybrid I/O coherent write requests may be explained by a lower bandwidth availability along the 110 coherent write data path 320a, 320b, 320c, 320d through the coherency domain 314 than the hybrid I/O coherent write data path 330a, 330d through the coherent interconnect 312 without passing through the coherency domain 314.

FIGS. 3A-3C illustrate non-limiting examples of a heterogeneous computing device configured to implement a hybrid I/O coherent write system and/or a dynamic I/O coherency system. The examples illustrated and described herein, particularly with reference to those of and relating to FIGS. 3A-3C, are non-limiting. The heterogeneous computing device configured to implement a hybrid I/O coherent write system and/or a dynamic I/O coherency system may include any number and/or combination of processing devices, processor cores, processing device caches (e.g., private caches and/or shared caches), coherent interconnects, shared memories, and connections between such components.

FIGS. 4-9 illustrate example aspects of workload offloading. These examples illustrate workload offloading from a processing device (e.g., CPU) 302 to a hardware accelerator (e.g., GPU, DSP, custom hardware accelerator, etc.) 306. These examples illustrate workload offloading between the processing device 302 and a single hardware accelerator 306. In various aspects, data transmitted between the processing device 302 and the hardware accelerator 306 may be transmitted through reads/writes to a shared memory (e.g., shared memory 304 in FIGS. 3A-3C), and can be triggered via a cache miss mechanism. In various aspects, data transmission, including via the shared memory, may occur throughout execution of the offloaded workload. These examples of one to one workload offloading are nonlimiting, and the processing device 302 may offload portions of the workload to any number of hardware accelerators 306 and/or other processing devices 302, including via any number of shared memories.

In each of the examples illustrated in FIGS. 4-9, the processing device 302 may be tasked with executing a workload. The processing device 302 may be configured to offload portions of the workload to the hardware accelerator 306. The data for the offloaded workload may be stored in the processing device cache (e.g., processing device cache 308 in FIG. 3A). The data may be transmitted via the coherent interconnect (e.g., coherent interconnect 312 in FIGS. 3A-3C) to the hardware accelerator 306. In various aspects, the data may be transmitted through the shared memory communicatively connect or integral to the coherent interconnect. The hardware accelerator 306 may execute the offloaded workload using the transmitted data, and transmit the results back to the processing device 302 to be written to the processing device cache.

Figure 4:
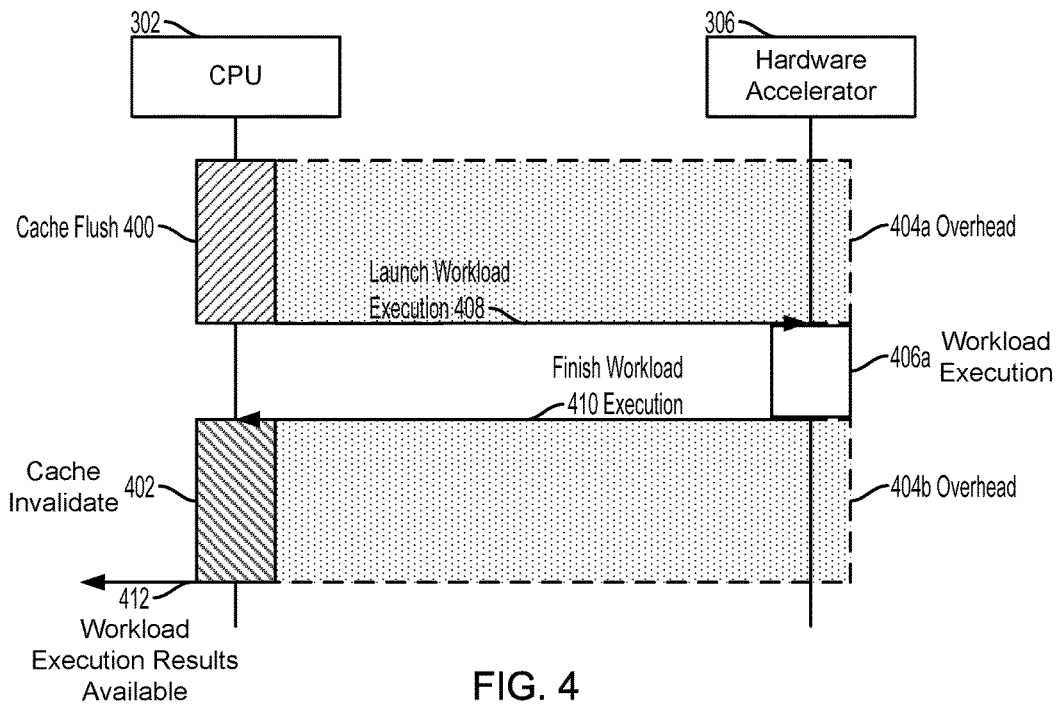
FIG. 4 is a signal and process diagram illustrating an example of non-I/O coherent workload processing for implementing an aspect.

FIG. 4 illustrates an example aspect of non-I/O coherent workload processing. To transmit the data for the offloaded workload to the hardware accelerator 306, and to output the results received from the hardware accelerator 306, the processing device 302 may implement cache maintenance operations to write the data to either the shared memory and then to the hardware accelerator 306 or directly to the hardware accelerator 306 via the coherent interconnect. As noted herein, during non-I/O coherent data transmissions, the coherent interconnect may transmit data between the data between the processing device 302 and the shared memory and/or the hardware accelerator 306 without conducting coherency operations.

To transmit the data for the offloaded workload to the hardware accelerator 306, the processing device 302 may implement a cache flush maintenance operation 400 to write the data to the shared memory and/or to the hardware accelerator 306 via the coherent interconnect. The cache flush maintenance operation 400 writing the data to multiple destination creates an overhead 404a, which may vary depending on the amount of data in the processing device cache that is written out for the offloaded workload. The data stored in the processing device cache may be stored in partitions or buffers, and the cache flush maintenance operation 400 may be implemented for such specific portions of the processing device cache. Otherwise, the cache flush maintenance operation 400 may be implemented for the whole processing device cache. The overhead 404a may delay the commencement of the offloaded workload execution by the hardware accelerator 306.

During a time correlating to the overhead 404a of the cache flush maintenance operation 400, the processing device 302 may complete offloading a portion of the workload to the hardware accelerator 306. In various aspects, offloading a portion of the workload to the hardware accelerator 306 may include data reads and writes by the hardware accelerator 306 accessing the processing device cache and/or the shared memory. Access to the shared memory may be implemented via a cache miss mechanism for cache misses of the processing device cache. The hardware accelerator 306 may execute the offloaded workload using the data retrieved from the processing device cache and/or the shared memory without needing to cache the data locally. In various aspects, the hardware accelerator 306 may store any transmitted data for the offloaded workload to its hardware accelerator cache (e.g., processing device cache 310a, 310b, 310c in FIGS. 3A-3C). The hardware accelerator 306 may launch execution of the offloaded workload 408, and execute the offloaded workload 406a. The length of time spent executing the offloaded workload may depend on various factors, including size and/or complexity of the offloaded workload, resource use and/or availability of and/or for the hardware accelerator 306 including electrical power, computing power, memory space, communication bandwidth, and/or environmental factors including temperature. The hardware accelerator 306 may finish the offloaded workload execution 410, returning the results of the offloaded workload execution 406a to the processing device 302 via the coherent interconnect.

To make the results of the offloaded workload execution available to the processing device 302, the processing device 302 may implement a cache invalidate maintenance operation 402 to direct future reads of the processing device cache space to the shared memory currently storing the results as a miss after the results are output by the hardware accelerator 306. The cache invalidate maintenance operation 402 may also create an overhead 404b, which may vary depending on the amount of data of the stored offloaded workload results or the space used in the in the processing device cache to store the offloaded workload results. The overhead 404b may delay the availability of the offloaded workload results for access by the processing device 302. Upon completion of the cache invalidate maintenance operation 402, the offloaded workload results may become available 412 for access, use, and/or output of the offloaded workload results by the processing device 302. The processing device 302 may receive the results of the offloaded workload execution 406a and store the results in its processing device cache.

Figure 5:
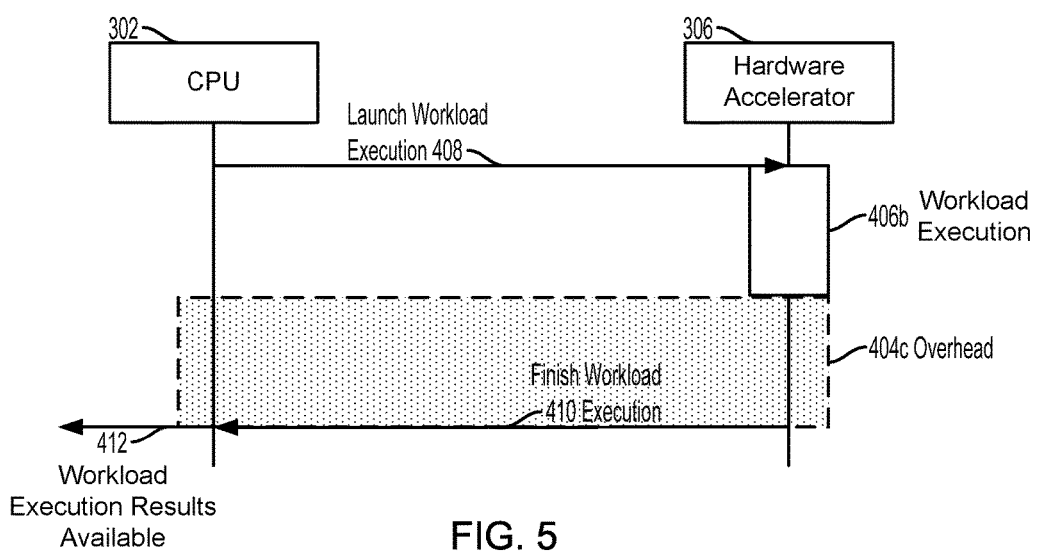
FIG. 5 is a signal and process diagram illustrating an example of I/O coherent workload processing for implementing an aspect.

FIG. 5 illustrates an example aspect of I/O coherent workload processing. To transmit the data for the offloaded workload to the hardware accelerator 306, and to output the results received from the hardware accelerator 306, coherency mechanisms (e.g., the coherency domain 314 in FIGS. 3A-3C and/or a snoop filter) may be continuously implemented by the coherent interconnect to ensure the correctness of the data in the processing device cache and/or the shared memory. Thus, while the processing device cache and/or the shared memory are in an I/O coherent mode, the processing device 302 may not implement the cache maintenance operations that it may implement for a non-I/O coherent mode.

The processing device 302 may offload a portion of the workload to the hardware accelerator 306. In various aspects, offloading a portion of the workload to the hardware accelerator 306 may include data reads and writes by the hardware accelerator 306 accessing the processing device cache and/or the shared memory. Access to the shared memory may be implemented via a cache miss mechanism for cache misses of the processing device cache. The hardware accelerator 306 may execute the offloaded workload using the data retrieved from the processing device cache and/or the shared memory without needing to cache the data locally. In various aspects, the hardware accelerator 306 may store any transmitted data for the offloaded workload to its hardware accelerator cache (e.g., processing device cache 310a, 310b, 310c in FIGS. 3A-3C). The hardware accelerator 306 may launch execution of the offloaded workload 408, and execute the offloaded workload 406b. Rather than incurring overhead for transmitting the offloaded workload data as for a processing device cache and/or the shared memory in the non-I/O coherent mode, in the I/O coherent mode the coherency may be maintained while the data is transferred so that no overhead is incurred before the launch execution of the offloaded workload 408.

An increase in overhead 404c may still be incurred during execution of the offloaded workload 406b. This overhead 404c may be caused by the performance of the coherent path the data of the offloaded workload result travels. The coherent interconnect may not be able to implement its coherency mechanisms and transfer the offloaded workload result as quickly as the hardware accelerator 306 produces the offloaded workload result. The coherent interconnect may cause a bottleneck for the offloaded workload result while implementing the coherency mechanisms resulting in the added overhead 404c. In various aspects, the overhead 404c may be proportional or roughly proportional to the run time of the hardware accelerator 306 for executing the offloaded workload 406b.

Once the coherency mechanisms of the coherent interconnect complete their operations to ensure correctness of the offloaded workload result in the processing device cache and/or the shared memory, the offloaded workload result may become available 412 access, use, and/or to output of the offloaded workload result by the processing device 302.

Figure 6:
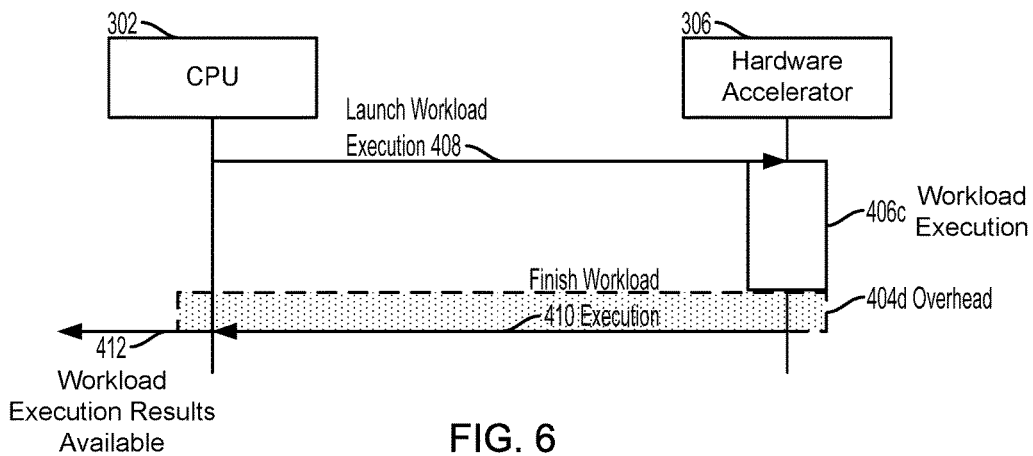
FIG. 6 is a signal and process diagram illustrating an example of dynamic I/O coherent workload processing for implementing an aspect.
Figure 7:
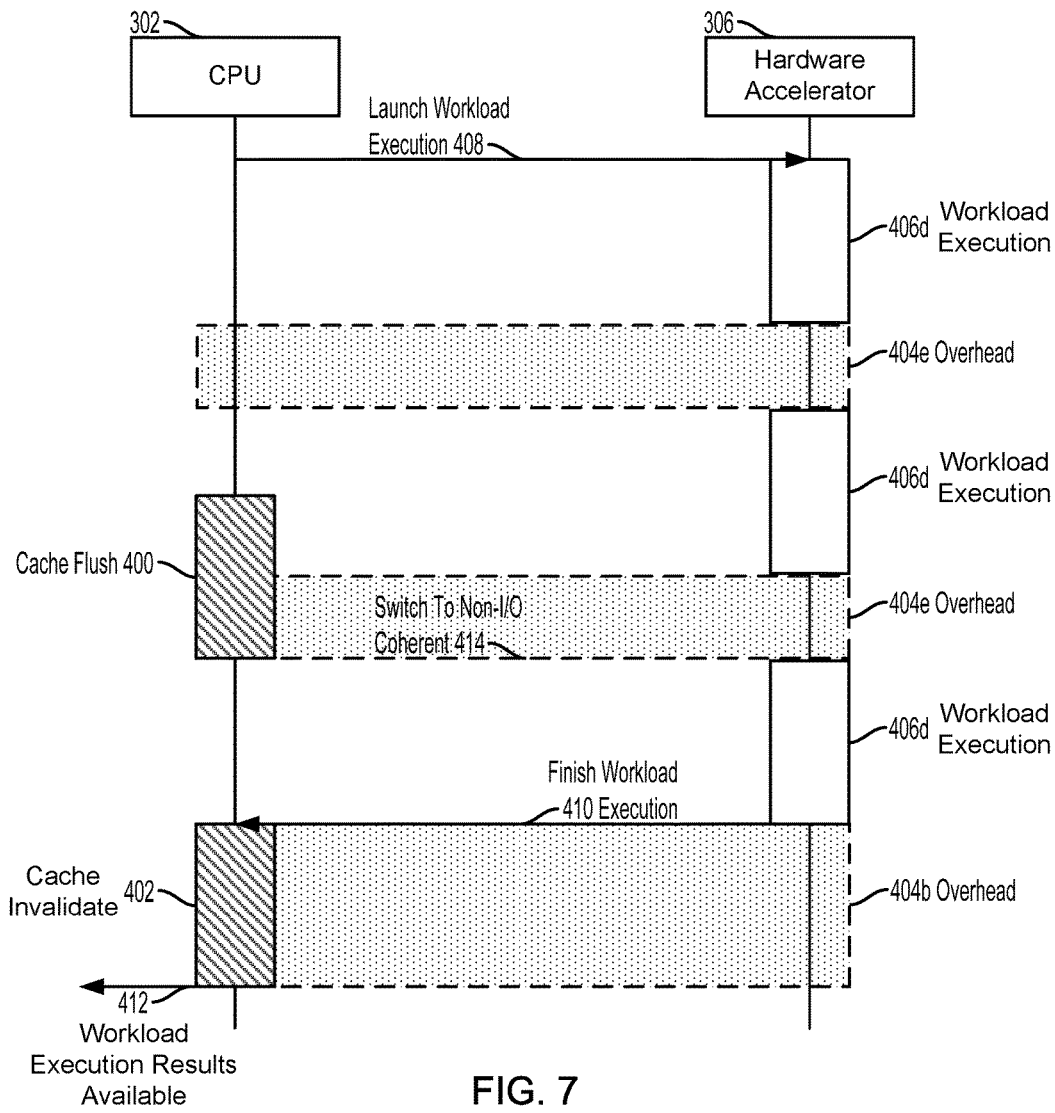
FIG. 7 is a signal and process diagram illustrating an example of dynamic I/O coherent workload processing for implementing an aspect.

FIGS. 6 and 7 illustrate example aspects of dynamic I/O coherent workload processing. In the examples illustrated in each of FIGS. 6 and 7, workload offloading by the processing device 302 may begin with the processing device cache and/or the shared memory in an I/O coherent mode. Thus, to transmit the data for the offloaded workload to the hardware accelerator 306, and to receive and/or output the results generated by the hardware accelerator 306, coherency mechanisms (e.g., the coherency domain 314 in FIGS. 3A-3C and/or a snoop filter) may be continuously implemented by the coherent interconnect to ensure the correctness of the data in the processing device cache and/or the shared memory. Thus, while the processing device cache and/or the shared memory are in an I/O coherent mode, the processing device 302 may not implement the cache maintenance operations that it may implement for a non-I/O coherent mode.

The processing device 302 may offload a portion of the workload to the hardware accelerator 306. In various aspects, offloading a portion of the workload to the hardware accelerator 306 may include data reads and writes by the hardware accelerator 306 accessing the processing device cache and/or the shared memory. Access to the shared memory may be implemented via a cache miss mechanism for cache misses of the processing device cache. The hardware accelerator 306 may execute the offloaded workload using the data retrieved from the processing device cache and/or the shared memory without needing to cache the data locally. In various aspects, the hardware accelerator 306 may store any transmitted data for the offloaded workload to its hardware accelerator cache (e.g., processing device cache 310a, 310b, 310c in FIGS. 3A-3C). The hardware accelerator 306 may launch execution of the offloaded workload 408 and execute the offloaded workload 406c, 406d. Rather than incurring overhead for transmitting the offloaded workload data as for a processing device cache and/or the shared memory in the non-I/O coherent mode, in the I/O coherent mode the coherency may be maintained while the data is transferred so that not overhead is incurred before the launch execution of the offloaded workload 408.

The example illustrated in FIG. 6 is an implementation of dynamic I/O coherent workload processing for a short run offloaded workload execution by the hardware accelerator 306. As described herein, an overhead 404*d* may still be incurred for execution of the offloaded workload 406*c*. In dynamic I/O coherent workload processing, as long as the overhead 404*d* remains below an overhead threshold, the execution of the offloaded workload 406*c* may continue with the processing device cache and/or the shared memory in an I/O coherent mode. Thus, the overhead 404*d* is limited to the overhead caused by the performance of the coherent interconnect transmitting the offloaded workload result as described herein. Once the coherency mechanisms of the coherent interconnect complete their operations to ensure correctness of the offloaded workload result in the processing device cache and/or the shared memory, the offloaded workload result may become available 412 for access, use, and/or output of the offloaded workload result by the processing device 302.

The example illustrated in FIG. 7 is an implementation of dynamic I/O coherent workload processing for a long run offloaded workload execution by the hardware accelerator 306. As described herein, an overhead 404*e* may still be incurred for execution of the offloaded workload 406*c*. In dynamic I/O coherent workload processing, a long run offloaded workload may produce an overhead 404*e* that exceeds an overhead threshold. Various methods may be used to detect a long run workload that exceeds the overhead threshold, including the processing device 302 entering an idle state, an elapsed time, and/or suffering of the execution of the offloaded workload, as described further herein.

In response to detecting a long run offloaded workload, the processing device 302 may dynamically transition the processing device cache and/or the shared memory from an I/O coherent mode to a non-I/O coherent mode. In order to transition from an I/O coherent mode to a non-I/O coherent mode, the processing device 302 may begin to implement cache maintenance operations while the processing device cache and/or the shared memory remains in an I/O coherent mode. For example, the processing device 302 may implement a cache flush maintenance operation 400 while the hardware accelerator continues the offloaded workload execution 404*d*. During the cache flush maintenance operation 400, the offloaded workload execution 404*d* may continue to incur the I/O coherent mode overhead 404*e*, but no overhead may be incurred for the cache flush maintenance operation 400. Thus, the overhead 404*d* may be limited to the overhead caused by the performance of the coherent interconnect transmitting the offloaded workload result as described herein Upon completion of the cache flush maintenance operation 400, the processing device cache and/or the shared memory may dynamically switch from an I/O coherent mode to a non-I/O coherent mode 414. The switch between an I/O coherent mode and a non-I/O coherent mode 414 may not interrupt the offloaded workload execution 404*d*. While the offloaded workload execution 404*d* continues, no more I/O coherent mode overhead 404*e* may be incurred. The hardware accelerator 306 may finish the offloaded workload execution 410, returning the results of the offloaded workload execution 406*d* to the processing device 302 via the coherent interconnect and/or the shared memory.

To make the results of the offloaded workload execution available to the processing device 302, the processing device 302 may implement a cache invalidate maintenance operation 402 as discussed further herein. The cache invalidate maintenance operation 402 may create an overhead 404*b*, which may vary depending on the amount of data of the stored offloaded workload results or the space used in the in the processing device cache to store the offloaded workload results. The overhead 404*b* may delay the availability of the offloaded workload results for access by the processing device 302. Upon completion of the cache invalidate maintenance operation 402, the offloaded workload results may become available 412 for access, use, and/or output of the offloaded workload results by the processing device 302. The processing device 302 may receive the results of the offloaded workload execution 406*a* and store the results in its processing device cache.

Figure 8:
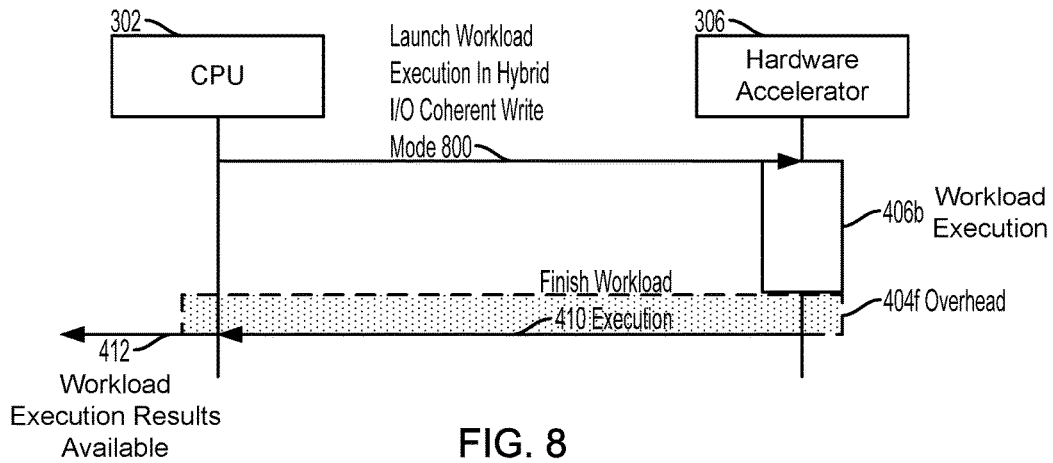
FIG. 8 is a signal and process diagram illustrating a method for implementing I/O coherent workload processing with hybrid I/O coherent write for implementing an aspect.

FIG. 8 illustrates an example aspect of I/O coherent workload processing with hybrid I/O coherent write. To transmit the data for the offloaded workload to the hardware accelerator 306, and to output the results received from the hardware accelerator 306, coherency mechanisms (e.g., the coherency domain 314 in FIGS. 3A-3C) may be continuously implemented by the coherent interconnect to ensure the correctness of the data in the processing device cache. Thus, while the processing device cache is in an I/O coherent mode, the processing device 302 may not implement the cache maintenance operations that it may implement for a non-I/O coherent mode.

I/O coherent workload processing with hybrid I/O coherent write may be similar to I/O coherent workload processing, as described herein with reference to FIG. 5. However, the inclusion of hybrid I/O coherent write in I/O coherent workload processing may reduce the amount of overhead incurred as transmission of the I/O coherent write data may not be hindered by transmitting the I/O coherent write data through the same coherency mechanisms as I/O coherent workload processing without hybrid I/O coherent write.

The processing device 302 may offload a portion of the workload to the hardware accelerator 306. The hardware accelerator 306 may store any transmitted data for the offloaded workload to its hardware accelerator cache (e.g., processing device cache 310*a*, 310*b*, 310*c* in FIG. 3), launch execution of the offloaded workload with hybrid I/O coherent write enabled 800, and execute the offloaded workload 406*b*. Rather than incurring overhead for transmitting the offloaded workload data as for a processing device cache in the non-I/O coherent mode, in the I/O coherent mode the coherency may be maintained while the data is transferred so that no overhead is incurred before the launch execution of the offloaded workload 408.

During execution of the offloaded workload 406*b*, a reduction in the overhead 404*c* in FIG. 5 may be realized as illustrated by the overheard 404*f*. The reduction in overhead may result from the reduced latency in executing I/O coherent write request by executing hybrid I/O coherent write requests which bypass sending the I/O coherent write date through the coherency mechanisms. The hardware accelerator 306 may finish the offloaded workload execution 410, and the offloaded workload result may become available 412 for the processing device 302 to output the offloaded workload result.

Figure 9:
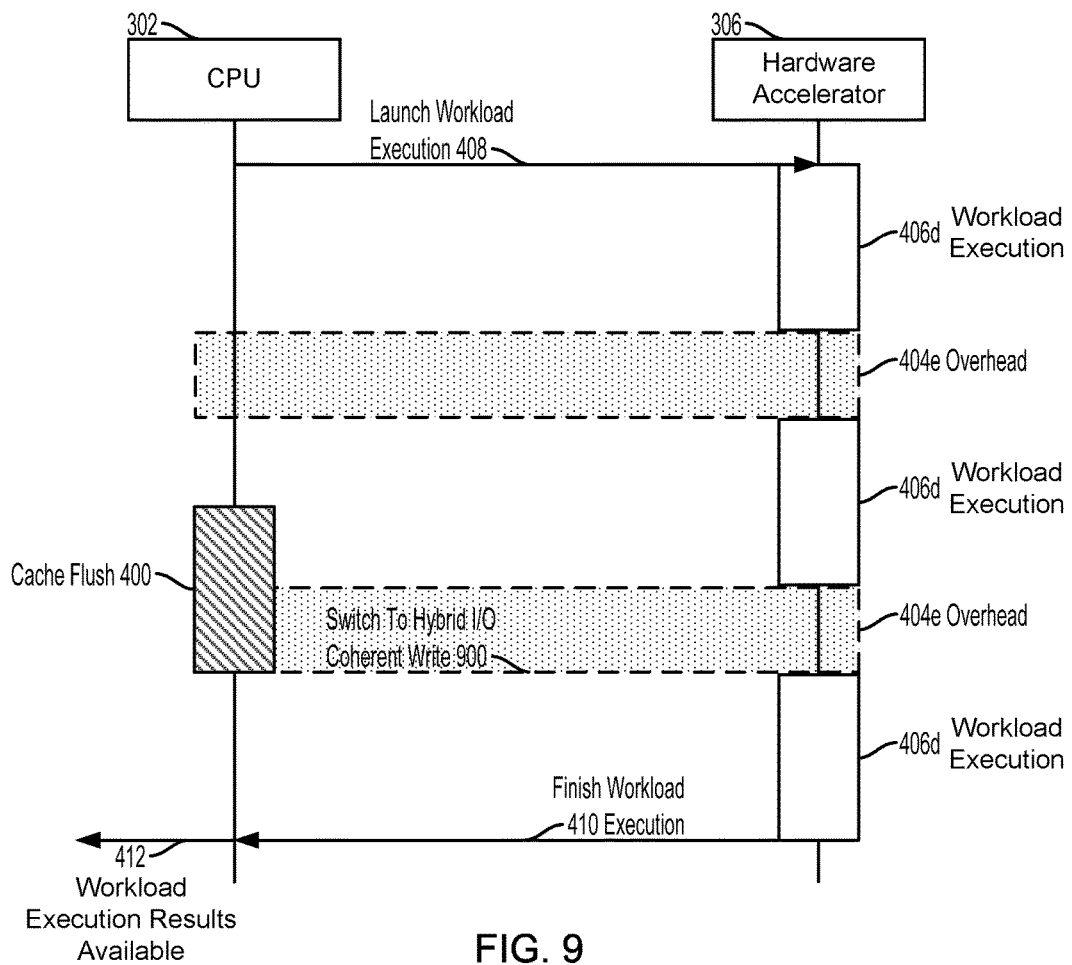
FIG. 9 is a signal and process diagram illustrating a method for implementing dynamic I/O coherent workload processing with hybrid I/O coherent write for implementing an aspect.

FIG. 9 illustrates an example aspect of dynamic I/O coherent workload processing with hybrid I/O coherent write. In the example illustrated in FIG. 9, workload offloading by the processing device 302 the processing device cache may be in an I/O coherent mode. Thus, to transmit the data for the offloaded workload to the hardware accelerator 306, and to output the results received from the hardware accelerator 306, coherency mechanisms (e.g., the coherency domain 314 in FIGS. 3A-3C) may be continuously implemented by the coherent interconnect 312 to ensure the correctness of the data in the processing device cache. Thus, while the processing device is in an I/O coherent mode, the processing device 302 may not implement the cache maintenance operations that it may implement for a non-I/O coherent mode.

Dynamic I/O coherent workload processing with hybrid I/O coherent write may be similar to dynamic I/O coherent workload processing, as described herein with reference to FIG. 7. However, the inclusion of hybrid I/O coherent write in I/O coherent workload processing may reduce the amount of overhead incurred as transmission of the I/O coherent write data may not be hindered by transmitting the I/O coherent write data through the same coherency mechanisms as I/O coherent workload processing without hybrid I/O coherent write. The inclusion of hybrid I/O coherent write in I/O coherent workload processing may also reduce the amount of overhead incurred since hybrid I/O coherent write may be I/O coherent, as opposed to the non-I/O coherent processing used in response to detecting the dynamic trigger. Therefore, the invalidate cache maintenance operation may be skipped since I/O coherency operations executed during the dynamic I/O coherent workload processing with hybrid I/O coherent write may obviate the need to invalidate portions of the processing device cache.

The processing device 302 may offload a portion of the workload to the hardware accelerator 306. The hardware accelerator 306 may store any transmitted data for the offloaded workload to its hardware accelerator cache (e.g., processing device cache 310a, 310b, 310c in FIGS. 3A-3C) and launch execution of the offloaded workload 408 and execute the offloaded workload 406d. Rather than incurring overhead for transmitting the offloaded workload data as for a processing device cache in the non-I/O coherent mode, in the I/O coherent mode the coherency may be maintained while the data is transferred so that not overhead is incurred before the launch execution of the offloaded workload 408.

The example illustrated in FIG. 9 is an implementation of dynamic I/O coherent workload processing for a long run offloaded workload execution by the hardware accelerator 306. As described herein, an overhead 404e may still be incurred for execution of the offloaded workload 406c. In dynamic I/O coherent workload processing, a long run offloaded workload may produce an overhead 404e that exceeds an overhead threshold. Various methods may be used to detect a long run workload that exceeds the overhead threshold, including the processing device 302 entering an idle state, an elapsed time, and/or suffering of the execution of the offloaded workload, as described further herein.

In response to detecting a long run offloaded workload, the coherent interconnect may dynamically transition to a hybrid I/O coherent write mode. In order to transition from an I/O coherent mode to a non-I/O coherent mode, the processing device 302 may begin to implement cache maintenance operations while the coherent interconnect remains in an non-hybrid I/O coherent write mode. For example, the processing device 302 may implement a cache flush maintenance operation 400 while the hardware accelerator continues the offloaded workload execution 404d. During the cache flush maintenance operation 400, the offloaded workload execution 404d may continue to incur the I/O coherent mode overhead 404e, but no overhead may be incurred for the cache flush maintenance operation 400. Thus, the overhead 404d may be limited to the overhead caused by the performance of the coherent interconnect transmitting the offloaded workload result as described herein Upon completion of the cache flush maintenance operation 400, the coherent interconnect may dynamically transition to a hybrid I/O coherent write mode 900. The switch between a non-hybrid I/O coherent write mode and a hybrid I/O coherent write mode 414 may not interrupt the offloaded workload execution 404d. While the offloaded workload execution 404d continues, none or less I/O coherent mode overhead 404e may be incurred as a result of not transmitting the I/O coherent write through the coherency mechanisms. The hardware accelerator 306 may finish the offloaded workload execution 410, returning the results of the offloaded workload execution 406d to the processing device 302 via the coherent interconnect, and the offloaded workload results may become available 412 for the processing device 302 to output the offloaded workload results. As noted herein, execution of a cache invalidate maintenance operation prior to making the offloaded workload results available 412 may be obviated by remaining in a I/O coherent mode, as opposed to transitioning to a non-I/O coherent mode, thereby eliminating the overhead related with the cache invalidate maintenance operation (e.g., overheard 404b in FIG. 7).

Figure 10:
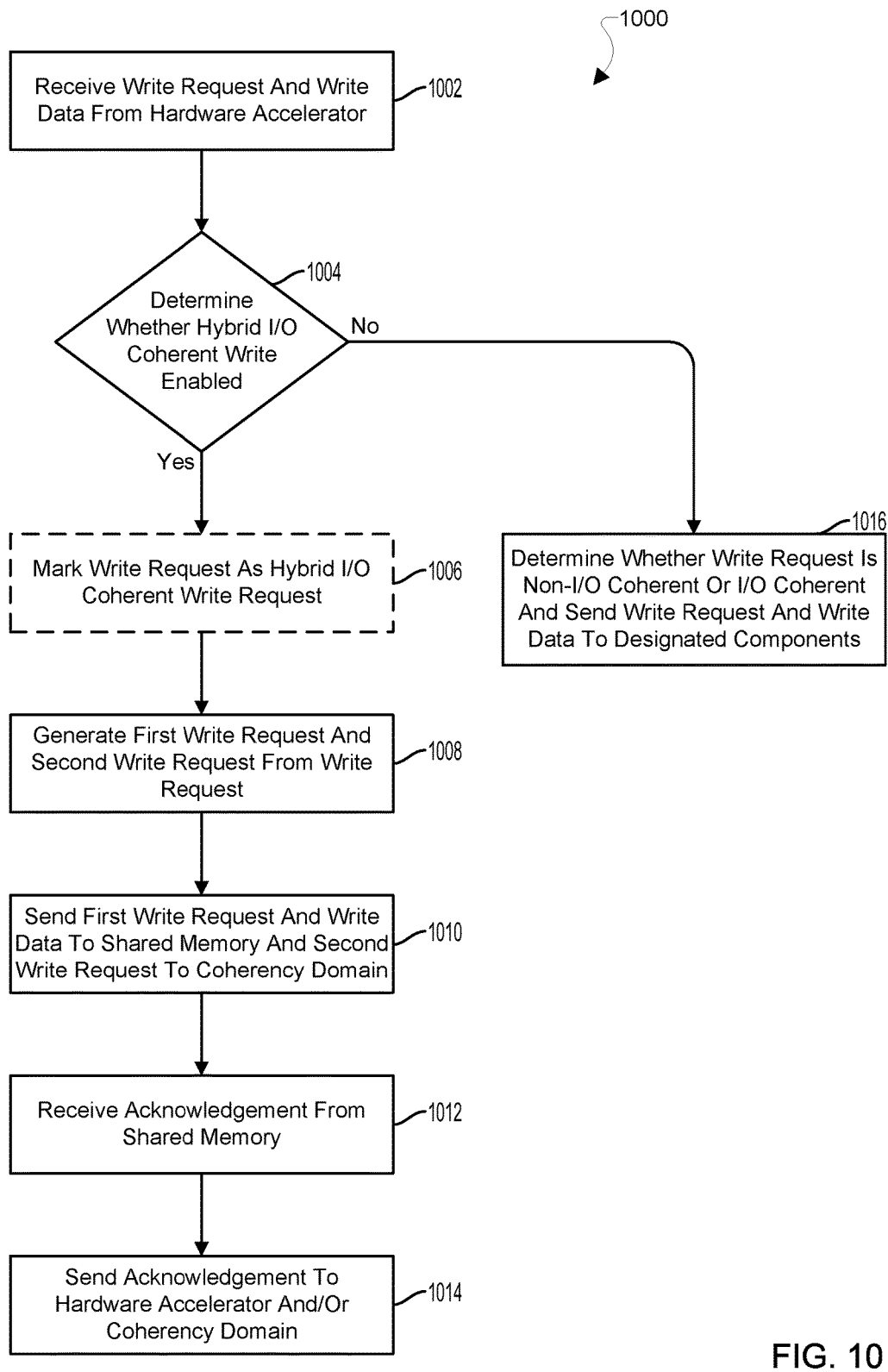
FIG. 10 is a process flow diagram illustrating a method for implementing hybrid I/O coherent write according to an aspect.

FIG. 10 illustrates a method 1000 for implementing hybrid I/O coherent write according to an aspect. The method 1000 may be implemented in a computing device in software executing in a processor (e.g., the processor 14 in FIGS. 1 and 2 and processing device 302 in FIGS. 3-9), in general purpose hardware, in dedicated hardware (e.g., the coherent interconnect 312 in FIGS. 3A-3C), or in a combination of a software-configured processor and dedicated hardware, such as a processor executing software within a dynamic I/O coherency system and/or hybrid I/O coherent write system (e.g., FIGS. 3A-3C) that includes other individual components. In order to encompass the alternative configurations enabled in the various aspects, the hardware implementing the method 1000 is referred to herein as a "processing device."

In block 1002 the processing device may receive an I/O coherent write request and an I/O coherent write data from a hardware accelerator (e.g., GPU 306a, DSP 306b, and custom hardware accelerator 306c in FIGS. 3A-3C, and hardware accelerator 306 in FIGS. 4-9).

In determination block 1004, the processing device may determine whether a hybrid I/O coherent write mode is enabled. In response to determining that the hybrid I/O coherent write mode is not enabled (i.e., determination block 1004="No"), the processing device may determine whether the write request is an I/O coherent write request or a non-I/O coherent write request and send the write request and the write data to designated components in block 1016. For an I/O coherent write request, the processing device may send the I/O coherent write request and the I/O coherent write data to a shared memory (e.g., shared memory 304 in FIGS. 3A-3C) and to a coherency domain (e.g., coherency domain 314 in FIGS. 3A-3C) in block 1016. For a non-I/O coherent write request, the processing device may send the non-I/O coherent write request and non-I/O coherent write data to the shared memory in block 1016.

In response to determining that the hybrid I/O coherent write mode is enabled (i.e., determination block 1004="Yes"), the processing device may mark the I/O coherent write request as a hybrid I/O coherent write request in optional block 1006. The processing device may mark the I/O coherent write request by adding and/or reusing a field in the I/O coherent write request with a mark, such as a specified bit or value, to indicate that the I/O coherent write request is a hybrid I/O coherent write request.

In block 1008, the processing device may generate a first hybrid I/O coherent write request and a second hybrid I/O coherent write request from the marked I/O coherent write request. In various aspects, one or both of the first hybrid I/O coherent write request and the second hybrid I/O coherent write request may be a copy of the marked I/O coherent write requests.

Rather than marking the I/O coherent write request as a hybrid I/O coherent write request in optional block 1006, in response to determining that the hybrid I/O coherent write mode is enabled (i.e., determination block 1004="Yes"), the processing device may mark the first hybrid I/O coherent write request and the second hybrid I/O coherent write request as hybrid I/O coherent write requests generated in block 1008.

In block 1010, the processing device may send the first hybrid I/O coherent write request and the I/O coherent write data to the shared memory and send the second hybrid I/O coherent write request to the coherency domain. As noted herein, the processing device may bypass sending the I/O coherent write data to the coherency domain for a hybrid I/O coherent write request or when the hybrid I/O coherent write mode is enabled.

In block 1012, the processing device may receive an acknowledgment of the first hybrid I/O coherent write request from the shared memory.

In block 1014, the processing device may send the acknowledgment of the first hybrid I/O coherent write request to the hardware accelerator and/or the coherency domain. As described further herein, in various aspects, an acknowledgment may be sent to the coherent interconnect and then sent by the coherent interconnect to the coherency domain. In various aspects, an acknowledgment may be sent to the coherent interconnect and the coherency domain, and the coherent interconnect may not need to send the acknowledgement to the coherency domain.

Figure 11:
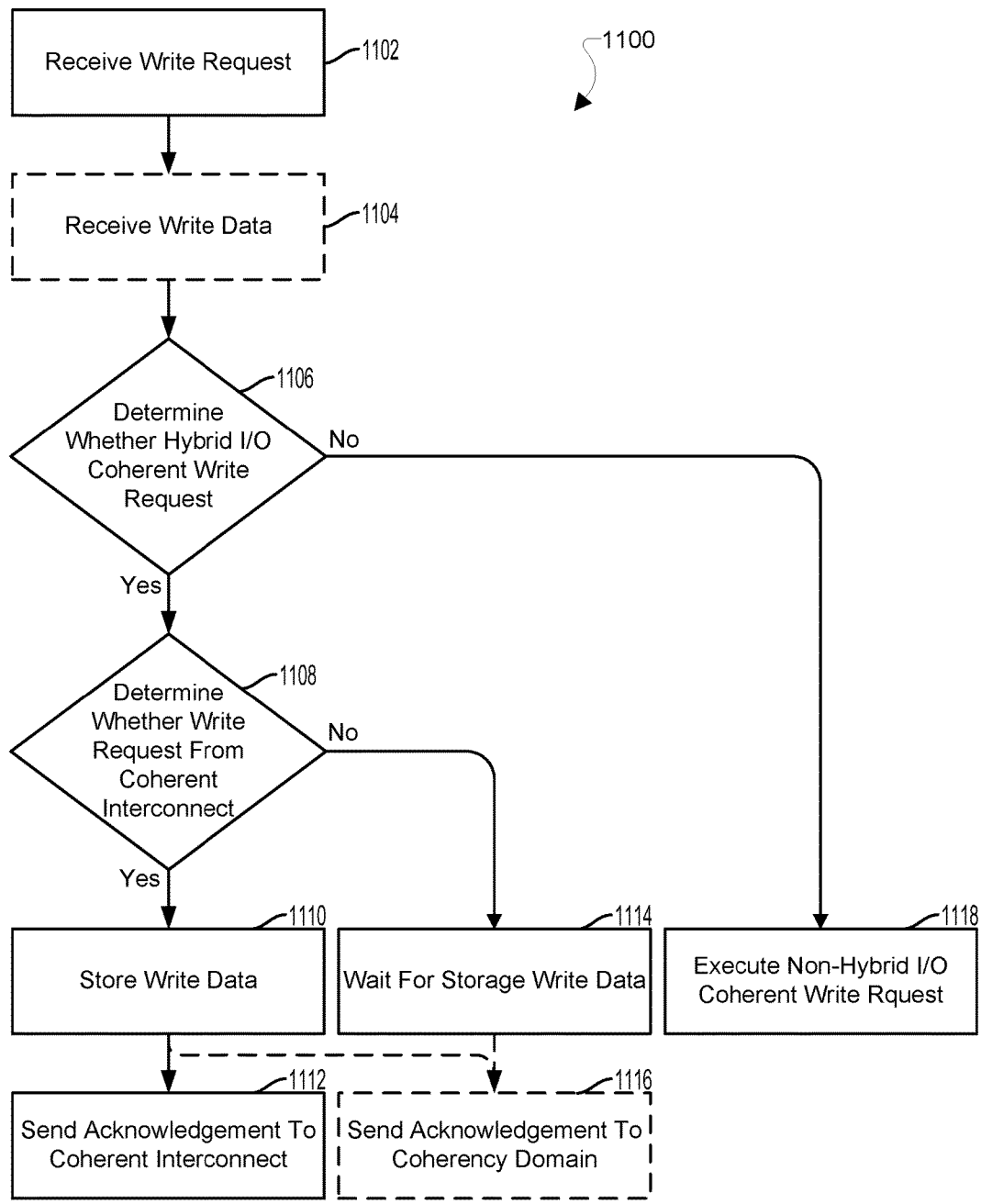
FIG. 11 is a process flow diagram illustrating a method for implementing hybrid I/O coherent write according to an aspect.

FIG. 11 illustrates a method 1100 for implementing hybrid I/O coherent write according to an aspect. The method 1100 may be implemented in a computing device in software executing in a processor (e.g., the processor 14 in FIGS. 1 and 2 and processing device 302 in FIGS. 3-9), in general purpose hardware, in dedicated hardware (e.g., the shared memory 304 in FIGS. 3A-3C, including a shared memory controller (not shown) configured to control access and implement read/write memory access requests for the shared memory 304), or in a combination of a software-configured processor and dedicated hardware, such as a processor executing software within a dynamic I/O coherency system and/or hybrid I/O coherent write system (e.g., FIGS. 3A-3C) that includes other individual components. In order to encompass the alternative configurations enabled in the various aspects, the hardware implementing the method 1000 is referred to herein as a "processing device."

In block 1102, the processing device may receive an I/O coherent write request. In various aspects, the I/O coherent write request may be received from a coherent interconnect (e.g., coherent interconnect 312 in FIGS. 3A-3C) or from a coherency domain (e.g., coherency domain 314 in FIGS. 3A-3C). In various aspects, the I/O coherent write request may be a hybrid I/O coherent write request, including the first hybrid I/O coherent write request or the second hybrid I/O coherent write request described herein.

In optional block 1104, the processing device may receive an I/O coherent write data. In various aspects, the I/O coherent write data may be received from the coherent interconnect or from the coherency domain. Block 1104 is optional as the processing device may not receive I/O coherent write data from the coherency domain for a hybrid I/O coherent write request.

In determination block 1106, the processing device may determine whether the received I/O coherent write request is a hybrid I/O coherent write request. The hybrid I/O coherent write request may include the first hybrid I/O coherent write request or the second hybrid I/O coherent write request. The processing device may be configured to check for a designated indicator that the received I/O coherent write request is a hybrid I/O coherent write request, such as a specific field of the received I/O coherent write request with a specific bit or value.

In response to determining that the received I/O coherent write request is not a hybrid I/O coherent write request (i.e., determination block 1106="No"), the processing device may execute a non-hybrid I/O coherent write request in block 1118.

In response to determining that the received I/O coherent write request is a hybrid I/O coherent write request (i.e., determination block 1106="Yes"), the processing device may determine whether the hybrid I/O coherent write request is received from the coherent interconnect in determination block 1108. In various aspects, the processing device may alternatively determine whether the hybrid I/O coherent write request is received from the coherency domain, or determine from which of the coherent interconnect and coherency domain the hybrid I/O coherent write request is received. In various aspects, the processing device may make these determinations of the source of the hybrid I/O coherent write request in using any of numerous identifiers, including an indicator included with the hybrid I/O coherent write request identifying the source of the hybrid I/O coherent write request, receiving the hybrid I/O coherent write request at a designated hardware location of the processing device, and/or whether the I/O coherent write data was also received and from the same source as the hybrid I/O coherent write request. The hybrid I/O coherent write request from the coherent interconnect may include the first hybrid I/O coherent write request and the hybrid I/O coherent write request from the coherency domain may include the second hybrid I/O coherent write request.

In response to determining that the hybrid I/O coherent write request is received from the coherent interconnect (i.e., determination block 1108="Yes"), the processing device may execute the hybrid I/O coherent write request by storing the I/O coherent write data to the shared memory in block 1110, and send an acknowledgement of the hybrid I/O coherent write request to the coherent interconnect in block 1112. In some aspects, the processing device may be configured to send an acknowledgement of the hybrid I/O coherent write request to the coherent interconnect in block 1112 and send an acknowledgement of the hybrid I/O coherent write request to the coherency domain in block 1116 when I/O coherent write data is stored to the shared memory in block 1110. In such aspects, the processing device may send the acknowledgement to the coherency domain or the coherent interconnect may send the acknowledgement to the coherency domain. The hybrid I/O coherent write request may include the first hybrid I/O coherent write request or the second hybrid I/O coherent write request.

In response to determining that the hybrid I/O coherent write request is not received from the coherent interconnect (i.e., determination block 1108="No") (i.e., the hybrid I/O coherent write request is received from the coherency domain), the processing device may wait in block 1114 for storing of the I/O coherent write data to the shared memory in block 1110. In some aspects, the processing device may send an acknowledgement of the hybrid I/O coherent write request to the coherent interconnect in block 1112 when I/O coherent write data is stored to the shared memory in block 1110 after waiting for the storage write data in block 1114. In some aspects, the processing device may send an acknowledgement of the hybrid I/O coherent write request to the coherency domain in block 1116 when I/O coherent write data is stored to the shared memory in block 1110 after waiting for the storage write data in block 1114. In the various aspects, the hybrid I/O coherent write request may include the first hybrid I/O coherent write request or the second hybrid I/O coherent write request.

Figure 12:
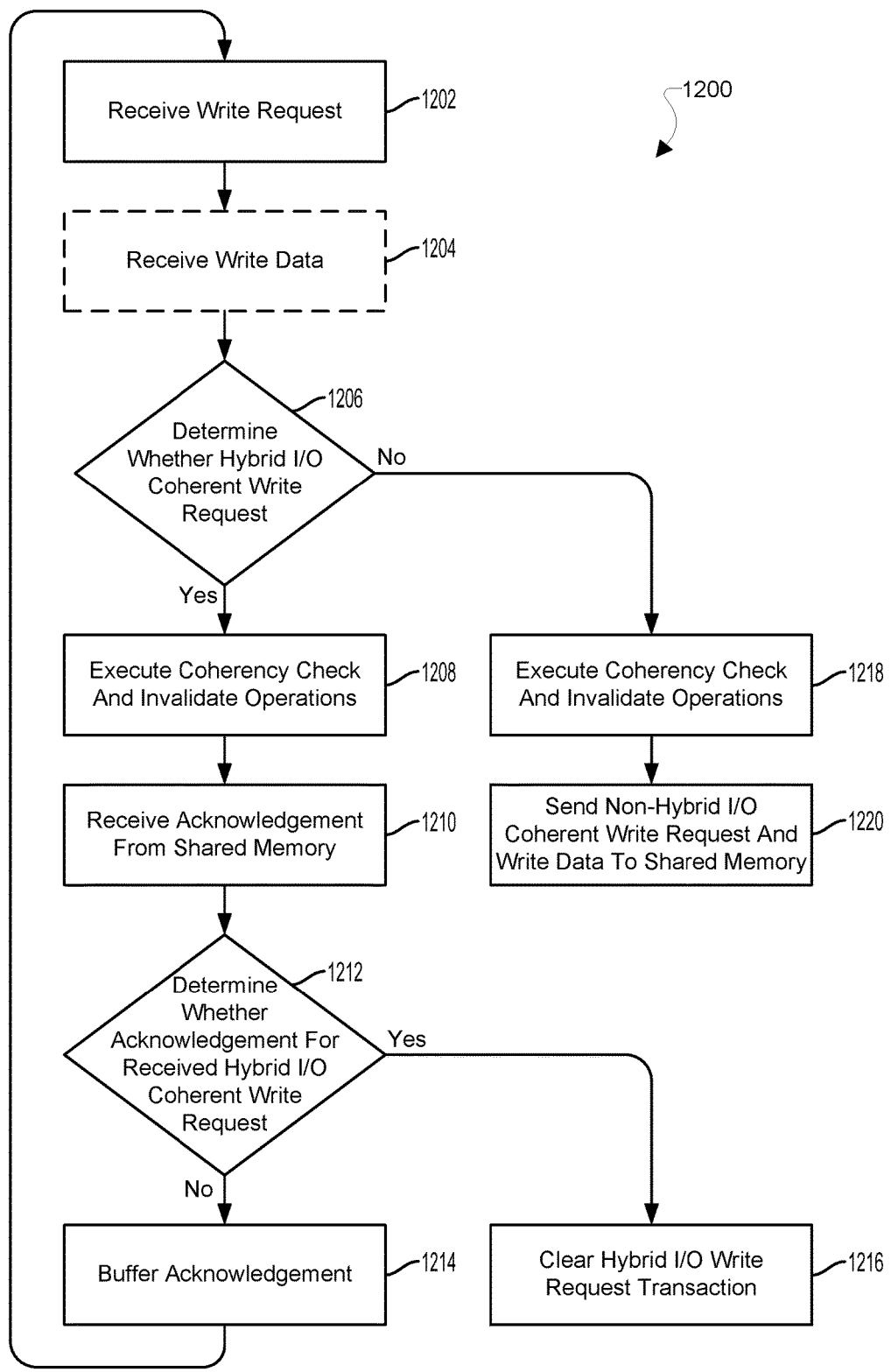
FIG. 12 is a process flow diagram illustrating a method for implementing hybrid I/O coherent write according to an aspect.

FIG. 12 illustrates a method 1200 for implementing hybrid I/O coherent write according to an aspect. The method 1200 may be implemented in a computing device in software executing in a processor (e.g., the processor 14 in FIGS. 1 and 2 and processing device 302 in FIGS. 3-9), in general purpose hardware, in dedicated hardware (e.g., the coherency domains 314 in FIGS. 3A-3C), or in a combination of a software-configured processor and dedicated hardware, such as a processor executing software within a dynamic I/O coherency system and/or hybrid I/O coherent write system (e.g., FIGS. 3A-3C) that includes other individual components. In order to encompass the alternative configurations enabled in the various aspects, the hardware implementing the method 1000 is referred to herein as a "processing device."

In block 1202, the processing device may receive an I/O coherent write request. In various aspects, the I/O coherent write request may be received from a coherent inter connect (e.g., coherent interconnect 312 in FIGS. 3A-3C). The hybrid I/O coherent write request may include the second hybrid I/O coherent write request.

In optional block 1204, the processing device may receive an I/O coherent write data. In various aspects, the I/O coherent write data may be received from the coherent interconnect. Block 1204 is optional as the processing device may not receive I/O coherent write data from the coherent interconnect for a hybrid I/O coherent write request.

In determination block 1206, the processing device may determine whether the received I/O coherent write request is a hybrid I/O coherent write request. The processing device may be configured to check for a designated indicator that the received I/O coherent write request is a hybrid I/O coherent write request, such as a specific field of the received I/O coherent write request with a specific bit or value. The hybrid I/O coherent write request may include the second hybrid I/O coherent write request.

In response to determining that the received I/O coherent write request is not a hybrid I/O coherent write request (i.e., determination block 1206="No"), the processing device may execute coherency check and invalidate operations for the received I/O coherent write data in block 1218. In block 1220, the processing device may send the non-hybrid I/O coherent write request and the I/O coherent write data to a shared memory (e.g., shared memory 304 in FIGS. 3A-3C). In various aspects, the processing device may send the non-hybrid I/O coherent write request and the I/O coherent write data to a shared memory via the coherent interconnect.

In response to determining that the received I/O coherent write request is not a hybrid I/O coherent write request (i.e., determination block 1206="Yes"), the processing device may execute coherency check and invalidate operations for the received I/O coherent write data in block 1208. In various aspects, the coherency check and invalidate operations may be executed for an address of I/O coherency write data specified by the hybrid I/O coherent write request, including the second hybrid I/O coherent write request. In block 1210, the processing device may receive an acknowledgment of the hybrid I/O coherent write request from the shared memory. The acknowledgment may be for the first hybrid I/O coherent write request and/or second hybrid I/O coherent write request.

In determination block 1212, the processing device may determine whether the acknowledgment is for an already received hybrid I/O coherent write request. In various aspects, an acknowledgment corresponding to a hybrid I/O coherent write request may be received at the coherency domain before the hybrid I/O coherent write request. This may be caused, for example, by congestion on an input of the coherency domain. To avoid processing an acknowledgment before processing the corresponding hybrid I/O coherent write request, the coherency domain may be configured to buffer acknowledgments until corresponding hybrid I/O coherent write requests are processed. The acknowledgment may be for the first hybrid I/O coherent write request and/or second hybrid I/O coherent write request. In various embodiments, the acknowledgment may be for the first hybrid I/O coherent write request and the received hybrid I/O coherent write request may include the second hybrid I/O coherent write request. The second hybrid I/O coherent write request may still correspond with the acknowledgement as it may be the same as the first hybrid I/O coherent write request.

In response to determining that the acknowledgement is not for an already received hybrid I/O coherent write request (i.e., determination block 1212="No"), the processing device may buffer the acknowledgement in block 1214. The processing device may buffer the acknowledgement in a local and/or privatized memory (e.g., memory 16, 24 in FIG. 1). The processing device may prevent processing of the acknowledgement by maintaining the acknowledgement in the buffer unit receiving the corresponding hybrid I/O coherent write request in block 1202 and determining that the acknowledgement is for is for an already received hybrid I/O coherent write request in determination block 1212. The hybrid I/O coherent write request may include the first hybrid I/O coherent write request and/or the second hybrid I/O coherent write request.

In response to determining that the acknowledgement is for an already received hybrid I/O coherent write request (i.e., determination block 1212="Yes"), the processing device may clear the hybrid I/O coherency write request transaction in block 1216. The hybrid I/O coherent write request may include the second hybrid I/O coherent write request.

Figure 13:
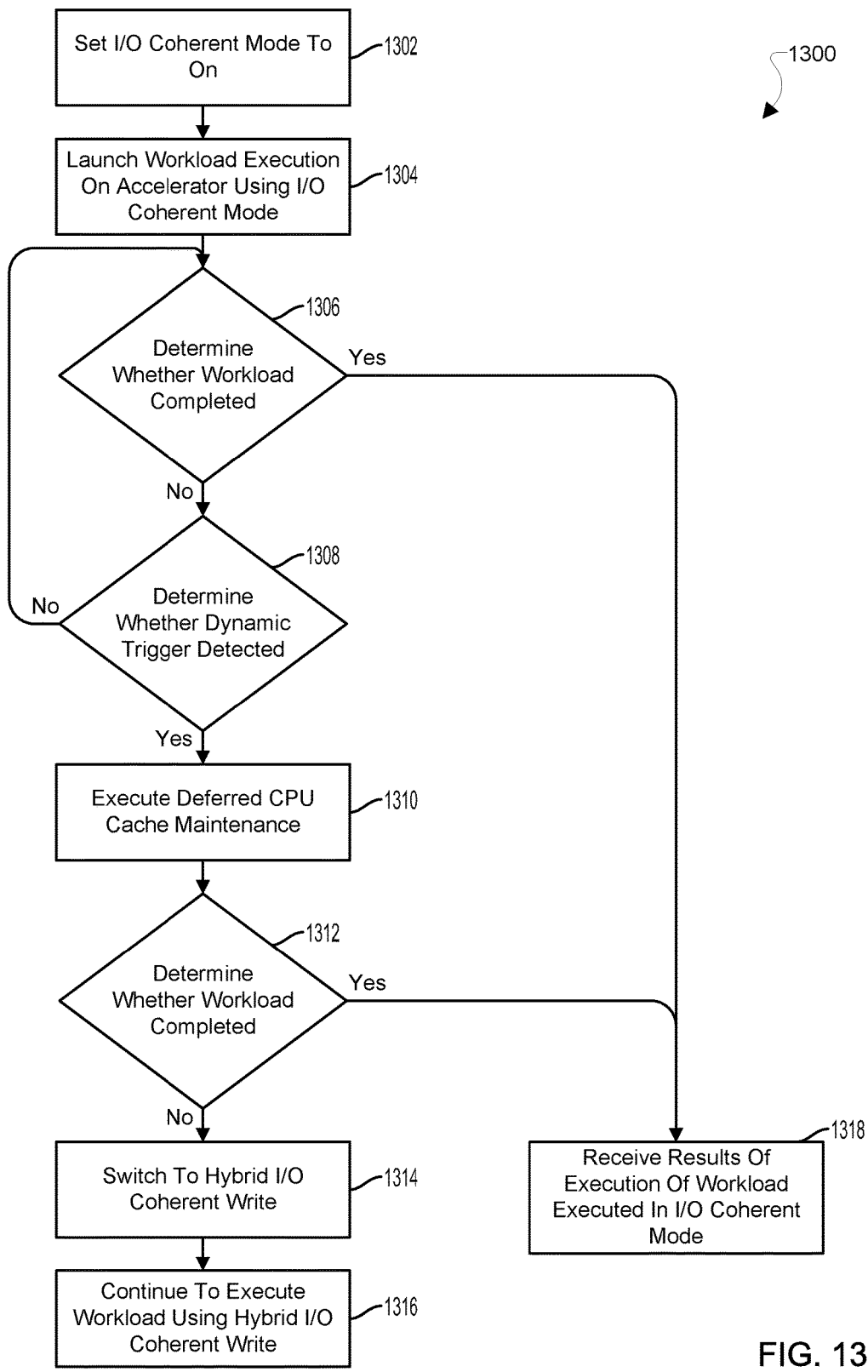
FIG. 13 is a process flow diagram illustrating a method for implementing dynamic I/O coherent workload processing with hybrid I/O coherent write according to an aspect.

FIG. 13 illustrates a method 1300 for implementing dynamic I/O coherent workload processing with hybrid I/O coherent write according to an aspect. The method 1300 may be implemented in a computing device in software executing in a processor (e.g., the processor 14 in FIGS. 1 and 2 and processing device 302 in FIGS. 3-7), in general purpose hardware, in dedicated hardware, or in a combination of a software-configured processor and dedicated hardware, such as a processor executing software within a dynamic I/O coherency system (e.g., FIGS. 3A-3C) that includes other individual components. In order to encompass the alternative configurations enabled in the various aspects, the hardware implementing the method 1300 is referred to herein as a "processing device."

In block 1302, the processing device may set an I/O coherent mode to "on" for a processing device cache (e.g., processing device cache 308 in FIG. 3A) and/or a shared memory (e.g., shared memory 304 in FIGS. 3A-3C). Alternatively, the processing device may set a non-I/O coherent mode to "off" for the processing device cache and/or the shared memory. In various aspects, the I/O coherent mode may be set to "on" as a default state for the processing device cache and/or the shared memory, therefore setting the I/O coherent mode to "on" may be unnecessary. Setting the I/O coherent mode to "on" may be a precautionary measure even if "on" is the default I/O coherent mode state.

In block 1304, the processing device may launch the offloaded workload execution on a hardware accelerator (e.g., GPU 306a, DSP 306b, custom hardware accelerator 306c in FIGS. 3A-3C and hardware accelerator 306 in FIGS. 4-7) using I/O coherent mode. As discussed herein, launching the execution may be immediate to the offloading of the workload to the hardware accelerator, as no overheard may be incurred for transmitting data from the processing device to the hardware accelerator for execution using I/O coherent mode. The memory access requests to transmit data between the processing device and the hardware accelerator may be routed through an I/O coherent path of the coherent interconnect (e.g., the coherency domain 314 in FIGS. 3A-3C). The data transmitted between the processing device and the hardware accelerator may include data from the processing device to the hardware accelerator for executing the offloaded workload and data from the hardware accelerator to the processing device as results of the executed offloaded workload. Data transmitted between the processing device and the hardware accelerator may be transmitted through the shared memory.

In determination block 1306, the processing device may determine whether the offloaded workload has been completed by the hardware accelerator.

In response to determining that the offloaded workload is completed by the hardware accelerator (i.e., determination block 1306="Yes"), the processing device may receive results of the execution of the offloaded workload from the hardware accelerator in block 1318. The results of the execution of the offloaded workload may be output by the hardware accelerator to the shared memory and retrieved from the shared memory by the processing device. Completion of execution of the offloaded workload entirely in I/O coherent mode may signify that cache maintenance operations are unnecessary as a result of the I/O coherent mechanisms of the coherent interconnect managing coherency of the data.

In response to determining that the offloaded workload is not completed by the hardware accelerator (i.e., determination block 1306="No"), the processing device may determine whether a dynamic trigger for switching between I/O coherent mode and non-I/O coherent mode is detected in determination block 1308. The dynamic trigger may be used to determine when the offloaded workload may be growing to the point that the I/O coherent mode overhead penalty may be undesirable or unacceptable. Determining whether the dynamic trigger is detected may be accomplished in any combination of various manners.

In some aspects, the dynamic trigger may include a preset or calculated time to elapse, and detecting the dynamic trigger may involve detecting that the time has elapsed. In various aspects, the time may be preset or calculated based on an expected amount of time for execution of the offloaded workload by the hardware accelerator. The expected execution time of the offloaded workload may be based on various factors, including size and/or complexity of the offloaded workload, resource use and/or availability of and/or for the hardware accelerator including electrical power, computing power, memory space, and/or communication bandwidth, and/or environmental factors including temperature. In various aspects, the time may be preset or calculated as a trivial value, such as zero (0), to trigger immediate switching between I/O coherent mode and non-I/O coherent mode.

In some aspects, the dynamic trigger may include sensing the processing device transitioning to and/or being in an idle state. The idle state may indicate that the hardware accelerator may be executing the offloaded workload slower than expected because the processing device has run out of work and is waiting for the hardware accelerator to finish the offloaded workload. The goal of offloading workloads is to efficiently use computing resources to execute the workloads. Thus, the processing device transitioning to and/or being in an idle state may indicate inefficient use of computing resources.

In some aspects, the dynamic trigger may include indicators of the execution of the offloaded workload suffering from using the I/O coherent path. Offloaded workload suffering may be detected based on a variety of metrics. Augmented workloads may notify a driver of performance. The use of static assignment or a method based on workload classification, either via testing or random testing, may lead to standard time-outs or signals that indicate workload suffering. Polling hardware performance registers may provide data that indicates workload suffering. Persistently high interconnect operating levels, such as bandwidth and/or outstanding transactions, near maximum may indicate throttling. High accelerator memory latency may indicate latency limitations. High accelerator memory backpressure may indicate bandwidth throttling. High accelerator idle due to memory in conjunction with high occupancy memory request queues may indicate that bandwidth is limited.

In response to determining that a dynamic trigger for switching between I/O coherent mode and non-I/O coherent mode is not detected (i.e., determination block 1308="No"), the processing device may determine whether the offloaded workload is completed by the hardware accelerator in determination block 1306.

In response to determining that a dynamic trigger for switching between I/O coherent mode and non-I/O coherent mode is detected (i.e., determination block 1308="Yes"), the processing device may execute deferred processing device cache maintenance in block 1310. As discussed herein, in preparation for switching from I/O coherent mode to non-I/O coherent mode, the processing device may execute a cache flush maintenance operation for the processing device cache. The hardware accelerator may continue to execute the offloaded workload while the processing device executes the cache flush maintenance operation in block 1310.

In determination block 1312, the processing device may determine whether the offloaded workload is completed by the hardware accelerator.

In response to determining that the offloaded workload is completed by the hardware accelerator (i.e., determination block 1312="Yes"), the processing device may receive results of the execution of the offloaded workload received from the hardware accelerator in block 1318. Completion of execution of the offloaded workload entirely in I/O coherent mode may signify that cache maintenance operations are unnecessary as a result of the I/O coherent mechanisms of the coherent interconnect managing coherency of the data. While the cache flush maintenance operation may already have executed, no additional overhead may be incurred by the execution of the cache flush maintenance operation, because of the cache flush maintenance operation's execution in parallel with the execution of the offloaded workload while in I/O coherent mode.

In response to determining that the offloaded workload is not completed by the hardware accelerator (i.e., determination block 1312="No"), the processing device may switch the coherent interconnect from a non-hybrid I/O coherent write mode to a hybrid I/O coherent write mode in block 1314. The switch from the non-hybrid I/O coherent write mode to the hybrid I/O coherent write mode in block 1314 may include setting a state of the hybrid I/O coherent write mode to "on" or setting a state of the non-hybrid I/O coherent write mode to "off". The switching from the non-hybrid I/O coherent write mode to the hybrid I/O coherent write mode may change the routing of the I/O coherent write data and the I/O coherent write requests through the coherent interconnect and the coherency domain as described further herein with reference to FIGS. 3B, 3C, and 8-12.

In block 1316, the hardware accelerator may continue execute the offloaded workload while the coherent interconnect is in a hybrid I/O coherent write mode, as described further herein.

Figure 14:
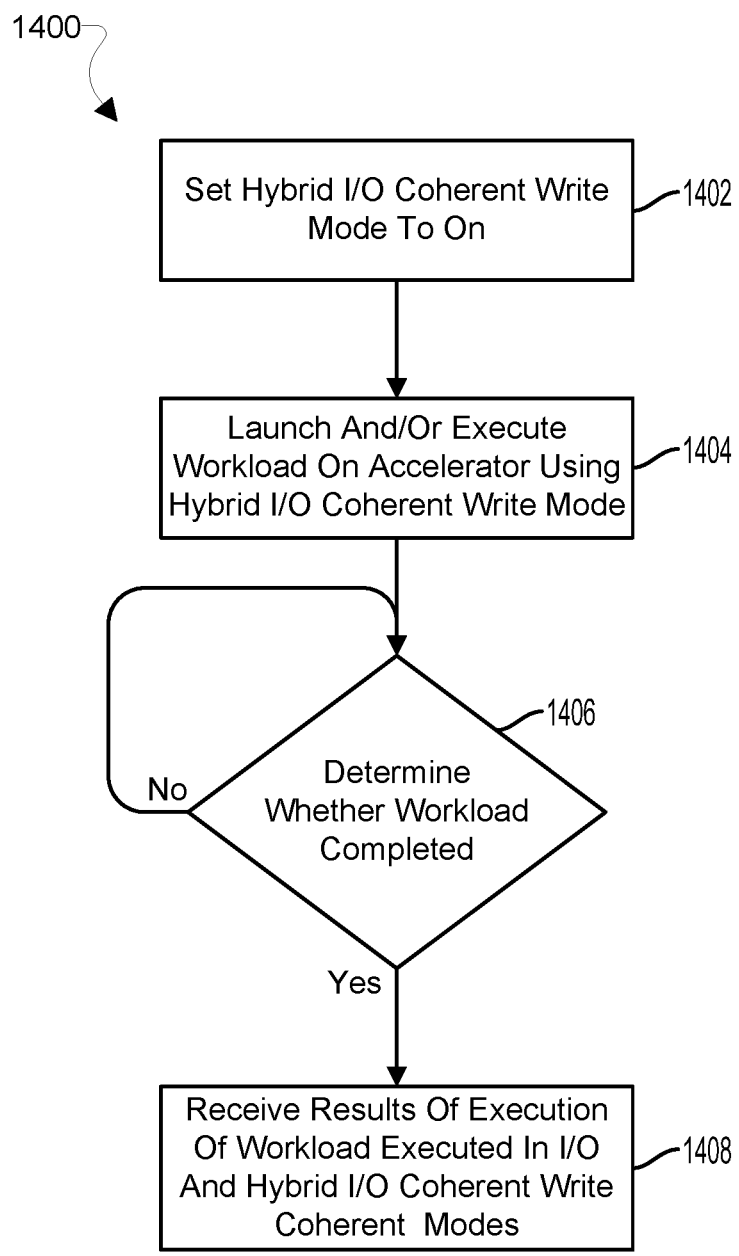
FIG. 14 is a process flow diagram illustrating a method for implementing I/O coherent and/or dynamic I/O coherent workload processing with hybrid I/O coherent write according to aspects.

FIG. 14 illustrates a method 1400 for implementing I/O coherent and/or dynamic I/O coherent workload processing with hybrid I/O coherent write according to an aspect. The method 1400 may be implemented in a computing device in software executing in a processor (e.g., the processor 14 in FIGS. 1 and 2 and processing device 302 in FIGS. 3-7), in general purpose hardware, in dedicated hardware, or in a combination of a software-configured processor and dedicated hardware, such as a processor executing software within a dynamic I/O coherency system (e.g., FIGS. 3A-3C) that includes other individual components. In order to encompass the alternative configurations enabled in the various aspects, the hardware implementing the method 1400 is referred to herein as a "processing device." In various aspects, the method 1400 may be a standalone method for implementing I/O coherent workload processing with hybrid I/O coherent write, and may further describe the blocks 1314 and 1316 of the method 1300 for implementing dynamic I/O coherent workload processing with hybrid I/O coherent write.

In block 1402, the processing device may set a hybrid I/O coherent write mode to "on" for a coherent interconnect (e.g., coherent interconnect 312 in FIGS. 3A-3C). Alternatively, the processing device may set a non-hybrid I/O coherent write mode to "off" for the coherent interconnect.

In block 1404, for implementing I/O coherent workload processing with hybrid I/O coherent write, the processing device may launch an offloaded workload execution on a hardware accelerator (e.g., GPU 306a, DSP 306b, custom hardware accelerator 306c in FIGS. 3A-3C and hardware accelerator 306 in FIGS. 4-7) using hybrid-I/O coherent write mode. As discussed herein, launching the execution may be immediate to offloading of the workload to the hardware accelerator, as no overhead may be incurred for transmitting data from the processing device to the hardware accelerator when using I/O coherent mode. In block 1404, for implementing dynamic I/O coherent workload processing with hybrid I/O coherent write, the hardware accelerator may execute the remaining offloaded workload while the hybrid I/O coherent write mode is enabled for the coherent interconnect.

In determination block 1406, the processing device may determine whether the remaining offloaded workload is completed by the hardware accelerator.

In response to determining that the offloaded workload is not completed by the hardware accelerator (i.e., determination block 1406="No"), the processing device may continuously determine whether the remaining offloaded workload is completed by the hardware accelerator in determination block 1406. While the offloaded workload is not completed by the hardware accelerator, the hardware accelerator may continue to execute the remaining offloaded workload in block 1404. During the execution of the remaining offloaded workload by the hardware accelerator, because the coherent interconnect has been switched to a hybrid I/O coherent write mode, the remaining workload may no longer incur overhead or as much overhead due to routing the I/O coherency write data to bypass the coherency mechanisms (e.g., coherency domain 314 in FIGS. 3A-3C) of the coherent interconnect.

In response to determining that the offloaded workload is completed by the hardware accelerator (i.e., determination block 1406="Yes"), the processing device may receive the offloaded workload results in block 1408. The processing device may receive and store the results of the execution of the offloaded workload in the processing device cache. As discussed herein, the coherency operations executed for the hybrid I/O coherency write request may obviate the need to execute further memory maintenance operations, include invalidate cache maintenance operations, to make the offloaded workload results available for output by the processing device.

Figure 15:
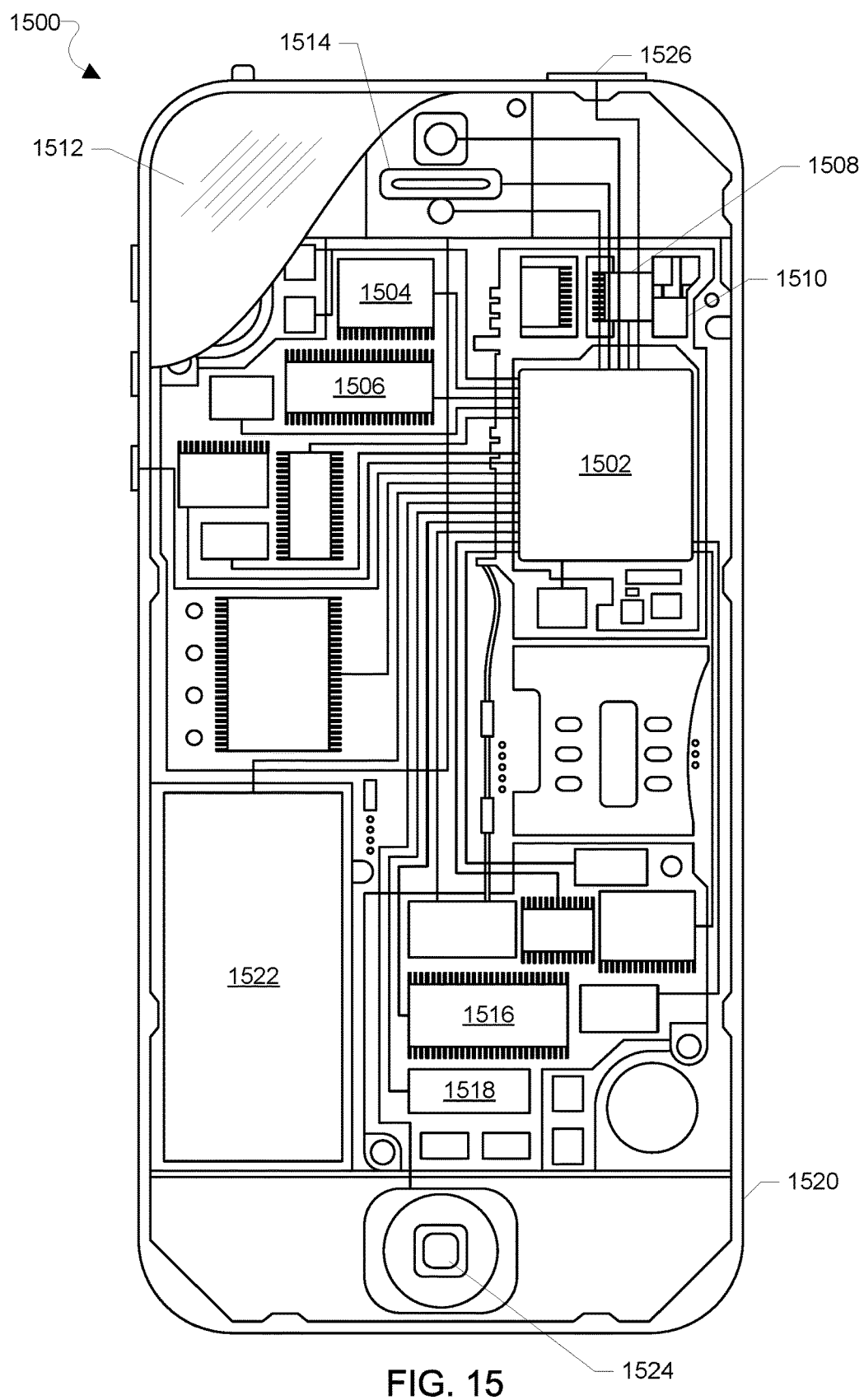
FIG. 15 is a component block diagram illustrating an example mobile computing device suitable for use with the various aspects.

The various aspects (including, but not limited to, aspects described above with reference to FIGS. 1-14) may be implemented in a wide variety of computing systems including mobile computing devices, an example of which suitable for use with the various aspects is illustrated in FIG. 15. The mobile computing device 1500 may include a processor 1502 coupled to a touchscreen controller 1504 and an internal memory 1506. The processor 1502 may be one or more multicore integrated circuits designated for general or specific processing tasks. The internal memory 1506 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1504 and the processor 1502 may also be coupled to a touchscreen panel 1512, such as a resistive-sensing touchscreen, capacitive-sensing touchscreen, infrared sensing touchscreen, etc. Additionally, the display of the computing device 1500 need not have touch screen capability.

The mobile computing device 1500 may have one or more radio signal transceivers 1508 (e.g., Peanut, Bluetooth, Zigbee, Wi-Fi, RF radio) and antennae 1510, for sending and receiving communications, coupled to each other and/or to the processor 1502. The transceivers 1508 and antennae 1510 may be used with the above-mentioned circuitry to implement the various wireless transmission protocol stacks and interfaces. The mobile computing device 1500 may include a cellular network wireless modem chip 1516 that enables communication via a cellular network and is coupled to the processor.

The mobile computing device 1500 may include a peripheral device connection interface 1518 coupled to the processor 1502. The peripheral device connection interface 1518 may be singularly configured to accept one type of connection, or may be configured to accept various types of physical and communication connections, common or proprietary, such as Universal Serial Bus (USB), FireWire, Thunderbolt, or PCIe. The peripheral device connection interface 1518 may also be coupled to a similarly configured peripheral device connection port (not shown).

The mobile computing device 1500 may also include speakers 1514 for providing audio outputs. The mobile computing device 1500 may also include a housing 1520, constructed of a plastic, metal, or a combination of materials, for containing all or some of the components described herein. The mobile computing device 1500 may include a power source 1522 coupled to the processor 1502, such as a disposable or rechargeable battery. The rechargeable battery may also be coupled to the peripheral device connection port to receive a charging current from a source external to the mobile computing device 1500. The mobile computing device 1500 may also include a physical button 1524 for receiving user inputs. The mobile computing device 1500 may also include a power button 1526 for turning the mobile computing device 1500 on and off.

Figure 16:
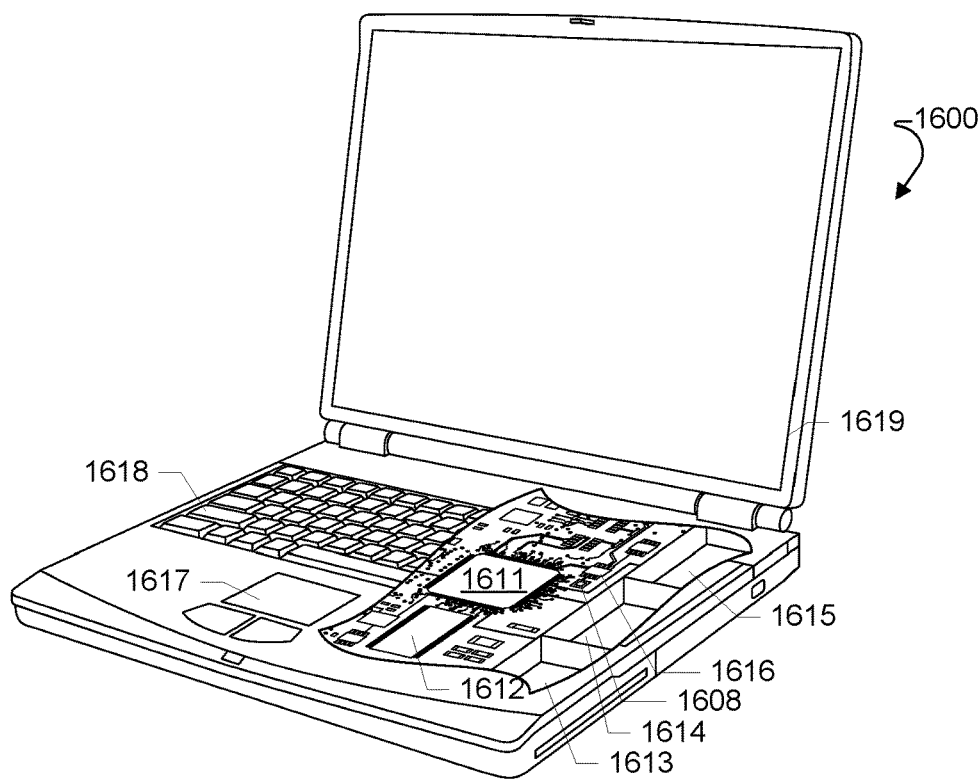
FIG. 16 is a component block diagram illustrating an example mobile computing device suitable for use with the various aspects.

The various aspects (including, but not limited to, aspects described above with reference to FIGS. 1-14) may be implemented in a wide variety of computing systems include a laptop computer 1600 an example of which is illustrated in FIG. 16. Many laptop computers include a touchpad touch surface 1617 that serves as the computer's pointing device, and thus may receive drag, scroll, and flick gestures similar to those implemented on computing devices equipped with a touch screen display and described above. A laptop computer 1600 will typically include a processor 1611 coupled to volatile memory 1612 and a large capacity nonvolatile memory, such as a disk drive 1613 of Flash memory. Additionally, the computer 1600 may have one or more antenna 1608 for sending and receiving electromagnetic radiation that may be connected to a wireless data link and/or cellular telephone transceiver 1616 coupled to the processor 1611. The computer 1600 may also include a floppy disc drive 1614 and a compact disc (CD) drive 1615 coupled to the processor 1611. In a notebook configuration, the computer housing includes the touchpad 1617, the keyboard 1618, and the display 1619 all coupled to the processor 1611. Other configurations of the computing device may include a computer mouse or trackball coupled to the processor (e.g., via a USB input) as are well known, which may also be used in conjunction with the various aspects.

Figure 17:
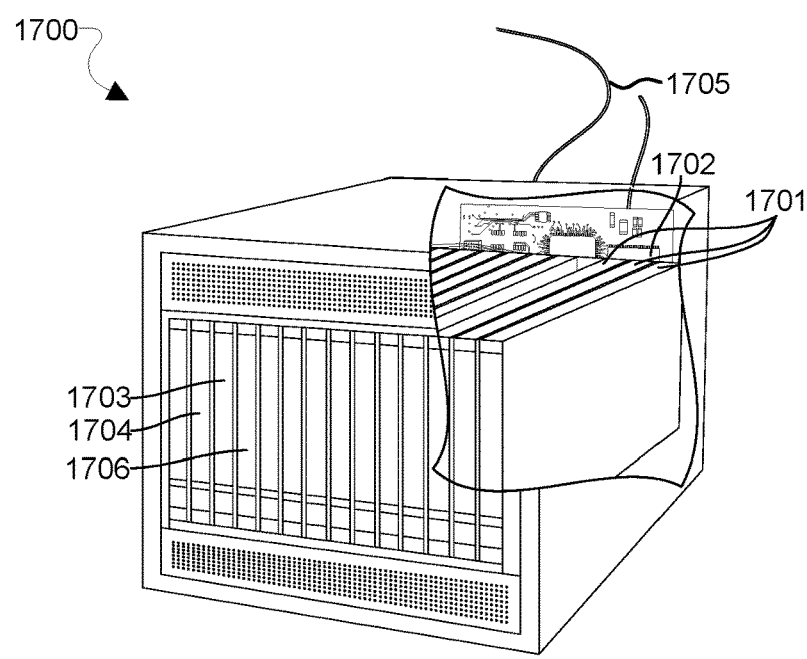
FIG. 17 is a component block diagram illustrating an example server suitable for use with the various aspects.

The various aspects (including, but not limited to, aspects described above with reference to FIGS. 1-14) may also be implemented in fixed computing systems, such as any of a variety of commercially available servers. An example server 1700 is illustrated in FIG. 17. Such a server 1700 typically includes one or more multicore processor assemblies 1701 coupled to volatile memory 1702 and a large capacity nonvolatile memory, such as a disk drive 1704. As illustrated in FIG. 17, multicore processor assemblies 1701 may be added to the server 1700 by inserting them into the racks of the assembly. The server 1700 may also include a floppy disc drive, compact disc (CD) or digital versatile disc (DVD) disc drive 1706 coupled to the processor 1701. The server 1700 may also include network access ports 1703 coupled to the multicore processor assemblies 1701 for establishing network interface connections with a network 1705, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects and implementations without departing from the scope of the claims. Thus, the present disclosure is not intended to be limited to the aspects and implementations described herein, but is to be accorded the widest scope consistent with the following claims and the principles and novel features disclosed herein.

What is claimed is:

1. A method of implementing a hybrid input/output (I/O) coherent write request on a computing device, comprising:
   receiving an I/O coherent write request;
   generating a first hybrid I/O coherent write request and a second hybrid I/O coherent write request by duplicating the I/O coherent write request;
   sending the first hybrid I/O coherent write request and I/O coherent write data of the I/O coherent write request to a shared memory; and
   sending the second hybrid I/O coherent write request duplicated from the I/O coherent write request to a coherency domain without sending the I/O coherent write data of the I/O coherent write request to the coherency domain.

2. The method of claim 1, further comprising determining whether a hybrid I/O coherent write mode is enabled,
   wherein generating a first hybrid I/O coherent write request and a second hybrid I/O coherent write request by duplicating the I/O coherent write request comprises generating the first hybrid I/O coherent write request and the second hybrid I/O coherent write request by duplicating the I/O coherent write request in response to determining that the hybrid I/O coherent write mode is enabled.

3. The method of claim 2, further comprising marking the I/O coherent write request as a hybrid I/O coherent write request in response to determining that the hybrid I/O coherent write mode is enabled.

4. The method of claim 1, further comprising:
   receiving an acknowledgement of the first hybrid I/O coherent write request from the shared memory; and
   sending the acknowledgement of the first hybrid I/O coherent write request to a processing device that issued the I/O coherent write request.

5. The method of claim 1, further comprising:
   receiving the second hybrid I/O coherent write request at the coherency domain;
   executing a coherency check for an address of the I/O coherency write data specified by the second hybrid I/O coherent write request; and
   receiving an acknowledgement of the first hybrid I/O coherent write request from the shared memory.

6. The method of claim 1, further comprising:
   receiving, from a coherent interconnect, the first hybrid I/O coherent write request and the I/O coherent write data at the shared memory;
   executing the first hybrid I/O coherent write request; and
   sending an acknowledgement of the first hybrid I/O coherent write request to the coherent interconnect.

7. The method of claim 6, further comprising:
   receiving the acknowledgement of the first hybrid I/O coherent write request by the coherency domain from the coherent interconnect; and
   receiving the acknowledgement of the first hybrid I/O coherent write request by a processing device that issued the I/O coherent write request from the coherent interconnect.

8. The method of claim 1, further comprising:
   offloading, by a processing device, a workload to a hardware accelerator for execution using an I/O coherent mode;
   detecting, by the processing device, a dynamic trigger for switching a coherent interconnect from a non-hybrid I/O coherent write mode to a hybrid I/O coherent write mode while the workload is executed by the hardware accelerator; and
   switching the coherent interconnect from a non-hybrid I/O coherent write mode to the hybrid I/O coherent write mode in response to detecting the dynamic trigger.

9. A computing device, comprising:
   a shared memory;
   a processing device;
   a coherency domain; and
   a coherent interconnect coupled to the shared memory, the processing device, and the coherency domain, wherein the coherent interconnect is configured with coherent interconnect-executable software instructions to:
   receive an I/O coherent write request;
   generate a first hybrid I/O coherent write request and a second hybrid I/O coherent write request by duplicating the I/O coherent write request;
   send the first hybrid I/O coherent write request and I/O coherent write data of the I/O coherent write request to the shared memory; and
   send the second hybrid I/O coherent write request duplicated from the I/O coherent write request to the coherency domain without sending the I/O coherent write data of the I/O coherent write request to the coherency domain.

10. The computing device of claim 9, wherein the coherent interconnect is further configured with coherent interconnect-executable software instructions to determine whether a hybrid I/O coherent write mode is enabled,
    wherein the coherent interconnect is further configured with coherent interconnect-executable software instructions to generate a first hybrid I/O coherent write request and a second hybrid I/O coherent write request by duplicating the I/O coherent write request by generating the first hybrid I/O coherent write request and the second hybrid I/O coherent write request by duplicating the I/O coherent write request in response to determining that the hybrid I/O coherent write mode is enabled.

11. The computing device of claim 10, wherein the coherent interconnect is further configured with coherent interconnect-executable software instructions to mark the I/O coherent write request as a hybrid I/O coherent write request in response to determining that the hybrid I/O coherent write mode is enabled.

12. The computing device of claim 9, wherein the coherent interconnect is further configured with coherent interconnect-executable software instructions to:
    receive an acknowledgement of the first hybrid I/O coherent write request from the shared memory; and
    send the acknowledgement of the first hybrid I/O coherent write request to the processing device that issued the I/O coherent write request.

13. The computing device of claim 9, wherein the coherency domain is configured with coherency domain-executable software instructions to:
    receive the second hybrid I/O coherent write request;
    execute a coherency check for an address of the I/O coherency write data specified by the second hybrid I/O coherent write request; and
    receive an acknowledgement of the first hybrid I/O coherent write request from the shared memory.

14. The computing device of claim 9, wherein the shared memory is configured with shared memory-executable software instructions to:
    receive, from the coherent interconnect, the first hybrid I/O coherent write request and the I/O coherent write data;
    execute the first hybrid I/O coherent write request; and
    send an acknowledgement of the first hybrid I/O coherent write request to the coherent interconnect.

15. The computing device of claim 14, wherein:
    the coherency domain is configured with coherency domain-executable software instructions to:
        receive the acknowledgement of the first hybrid I/O coherent write request from the coherent interconnect; and
    the processing device is configured with processor-executable software instructions to:
        receive the acknowledgement of the first hybrid I/O coherent write request from the coherent interconnect, wherein the processing device issued the I/O coherent write request.

16. The computing device of claim 9, wherein the processing device is a hardware accelerator, and the computing device further comprises a second processing device coupled to the coherent interconnect and configured with processor-executable software instructions to:
    offload a workload to the hardware accelerator for execution using an I/O coherent mode;
    detect a dynamic trigger for switching a coherent interconnect from a non-hybrid I/O coherent write mode to a hybrid I/O coherent write mode while the workload is executed by the hardware accelerator; and
    switch the coherent interconnect from a non-hybrid I/O coherent write mode to the hybrid I/O coherent write mode in response to detecting the dynamic trigger.

17. A computing device, comprising:
    a shared memory;
    a coherency domain;
    means for receiving an I/O coherent write request;
    means for generating a first hybrid I/O coherent write request and a second hybrid I/O coherent write request comprises means for duplicating the I/O coherent write request;
    means for sending the first hybrid I/O coherent write request and I/O coherent write data of the I/O coherent write request to the shared memory; and
    means for sending the second hybrid I/O coherent write request duplicated from the I/O coherent write request to the coherency domain without sending the I/O coherent write data of the I/O coherent write request to the coherency domain.

18. The computing device of claim 17, further comprising means for determining whether a hybrid I/O coherent write mode is enabled,
    wherein means for generating a first hybrid I/O coherent write request and a second hybrid I/O coherent write request comprises means for duplicating the I/O coherent write request comprises means for generating the first hybrid I/O coherent write request and the second hybrid I/O coherent write request comprises means for duplicating the I/O coherent write request in response to determining that the hybrid I/O coherent write mode is enabled.

19. The computing device of claim 18, further comprising means for marking the I/O coherent write request as a hybrid I/O coherent write request in response to determining that the hybrid I/O coherent write mode is enabled.

20. The computing device of claim 17, further comprising:
    means for receiving an acknowledgement of the first hybrid I/O coherent write request from the shared memory; and
    means for sending the acknowledgement of the first hybrid I/O coherent write request to a processing device that issued the I/O coherent write request.

21. The computing device of claim 17, further comprising:
    means for receiving the second hybrid I/O coherent write request at the coherency domain;
    means for executing a coherency check for an address of the I/O coherency write data specified by the second hybrid I/O coherent write request; and
    means for receiving an acknowledgement of the first hybrid I/O coherent write request from the shared memory.

22. The computing device of claim 17, further comprising:
    means for receiving, from a coherent interconnect, the first hybrid I/O coherent write request and the I/O coherent write data at the shared memory;
    means for executing the first hybrid I/O coherent write request; and
    means for sending an acknowledgement of the first hybrid I/O coherent write request to the coherent interconnect.

23. The computing device of claim 22, further comprising:
    means for receiving the acknowledgement of the first hybrid I/O coherent write request by the coherency domain from the coherent interconnect; and
    means for receiving the acknowledgement of the first hybrid I/O coherent write request by a processing device that issued the I/O coherent write request from the coherent interconnect.

24. A non-transitory processor-readable medium having stored thereon processor-executable instructions configured to cause a processing device of a computing device to perform operations comprising:
    receiving an I/O coherent write request;

generating a first hybrid I/O coherent write request and a second hybrid I/O coherent write request by duplicating the I/O coherent write request;

sending the first hybrid I/O coherent write request and I/O coherent write data of the I/O coherent write request to a shared memory; and sending the second hybrid I/O coherent write request duplicated from the I/O coherent write request to a coherency domain without sending the I/O coherent write data of the I/O coherent write request to the coherency domain.

25. The non-transitory processor-readable medium of claim 24, wherein the stored executable instructions are configured to cause the processing device of the computing device to perform operations further comprising determining whether a hybrid I/O coherent write mode is enabled, wherein generating a first hybrid I/O coherent write request and a second hybrid I/O coherent write request by duplicating the I/O coherent write request comprises generating the first hybrid I/O coherent write request and the second hybrid I/O coherent write request by duplicating the I/O coherent write request in response to determining that the hybrid I/O coherent write mode is enabled.

26. The non-transitory processor-readable medium of claim 25, wherein the stored executable instructions are configured to cause the processing device of the computing device to perform operations further comprising marking the I/O coherent write request as a hybrid I/O coherent write request in response to determining that the hybrid I/O coherent write mode is enabled.

27. The non-transitory processor-readable medium of claim 24, wherein the stored executable instructions are configured to cause the processing device of the computing device to perform operations further comprising:

receiving an acknowledgement of the first hybrid I/O coherent write request from the shared memory; and sending the acknowledgement of the first hybrid I/O coherent write request to a second processing device that issued the I/O coherent write request.

28. The non-transitory processor-readable medium of claim 24, wherein the stored executable instructions are configured to cause the processing device of the computing device to perform operations further comprising:

receiving the second hybrid I/O coherent write request;

executing a coherency check for an address of the I/O coherency write data specified by the second hybrid I/O coherent write request; and receiving an acknowledgement of the first hybrid I/O coherent write request from the shared memory.

29. The non-transitory processor-readable medium of claim 24, wherein the stored executable instructions are configured to cause the processing device of the computing device to perform operations further comprising:

receiving, from a coherent interconnect, the first hybrid I/O coherent write request and the I/O coherent write data;

executing the first hybrid I/O coherent write request; and sending an acknowledgement of the first hybrid I/O coherent write request to the coherent interconnect.

30. The non-transitory processor-readable medium of claim 29, wherein the stored executable instructions are configured to cause the processing device of the computing device to perform operations further comprising:

receiving the acknowledgement of the first hybrid I/O coherent write request from the coherent interconnect; and receiving the acknowledgement of the first hybrid I/O coherent write request, wherein the processing device issued the I/O coherent write request from the coherent interconnect.

* * * * *